United States Patent
Kacik et al.

(10) Patent No.: US 8,109,294 B2
(45) Date of Patent: Feb. 7, 2012

(54) VALVE CARTRIDGE WITH INTEGRAL STOP

(75) Inventors: Mark S. Kacik, Strongsville, OH (US); W. Randall Tucker, Oberlin, OH (US)

(73) Assignee: Moen Incorporated, North Olmsted, OH (US)

( * ) Notice: Subject to any disclaimer, the term of this patent is extended or adjusted under 35 U.S.C. 154(b) by 1043 days.

(21) Appl. No.: 12/023,819

(22) Filed: Jan. 31, 2008

(65) Prior Publication Data

US 2008/0178952 A1 Jul. 31, 2008

Related U.S. Application Data

(60) Provisional application No. 60/898,496, filed on Jan. 31, 2007.

(51) Int. Cl.
*F16K 11/06* (2006.01)
(52) U.S. Cl. .................................... 137/625.4; 251/288
(58) Field of Classification Search ............. 137/625.17, 137/625.4, 625.41; 251/284, 285
See application file for complete search history.

(56) References Cited

U.S. PATENT DOCUMENTS

| | | |
|---|---|---|
| 3,559,684 A | 2/1971 | Rudewick, III |
| 3,628,570 A * | 12/1971 | Andis ...................... 137/625.23 |
| 3,891,005 A | 6/1975 | Manoogian et al. |
| 3,915,195 A | 10/1975 | Manoogian et al. |
| 3,964,514 A | 6/1976 | Manoogian et al. |
| 4,200,123 A * | 4/1980 | Brandelli ................... 137/625.4 |
| 4,423,752 A | 1/1984 | Psarouthakis |
| 5,010,917 A | 4/1991 | Iqbal |
| 5,082,023 A | 1/1992 | D'Alayer de Costemore d'Arc |
| 5,363,880 A | 11/1994 | Hsieh |
| 5,386,852 A | 2/1995 | Bosio |
| 5,445,181 A | 8/1995 | Kuhn et al. |
| 5,467,799 A | 11/1995 | Buccicone et al. |
| 5,490,540 A | 2/1996 | Vom Dahl et al. |
| 5,522,429 A | 6/1996 | Bechte et al. |
| 5,725,010 A | 3/1998 | Marty et al. |
| 5,887,852 A | 3/1999 | Delaisement |
| 5,899,230 A | 5/1999 | Orlandi |
| 5,899,439 A | 5/1999 | Gottwald et al. |
| 5,967,184 A | 10/1999 | Chang |
| 5,992,457 A | 11/1999 | Humpert et al. |
| 6,170,523 B1 | 1/2001 | Chang |
| 6,626,203 B1 | 9/2003 | Schneider |
| 6,758,242 B2 | 7/2004 | Jones et al. |
| 7,007,717 B2 | 3/2006 | Lin |
| 2005/0194051 A1 * | 9/2005 | Pinette ..................... 137/625.41 |

* cited by examiner

*Primary Examiner* — John Fox
(74) *Attorney, Agent, or Firm* — Calfee, Halter & Griswold LLP

(57) ABSTRACT

A one-handle valve cartridge has a housing that functions as a stop for an actuating mechanism of the valve cartridge to define a range of flow rates and/or temperatures for which the water flowing through the valve cartridge is delivered.

10 Claims, 25 Drawing Sheets

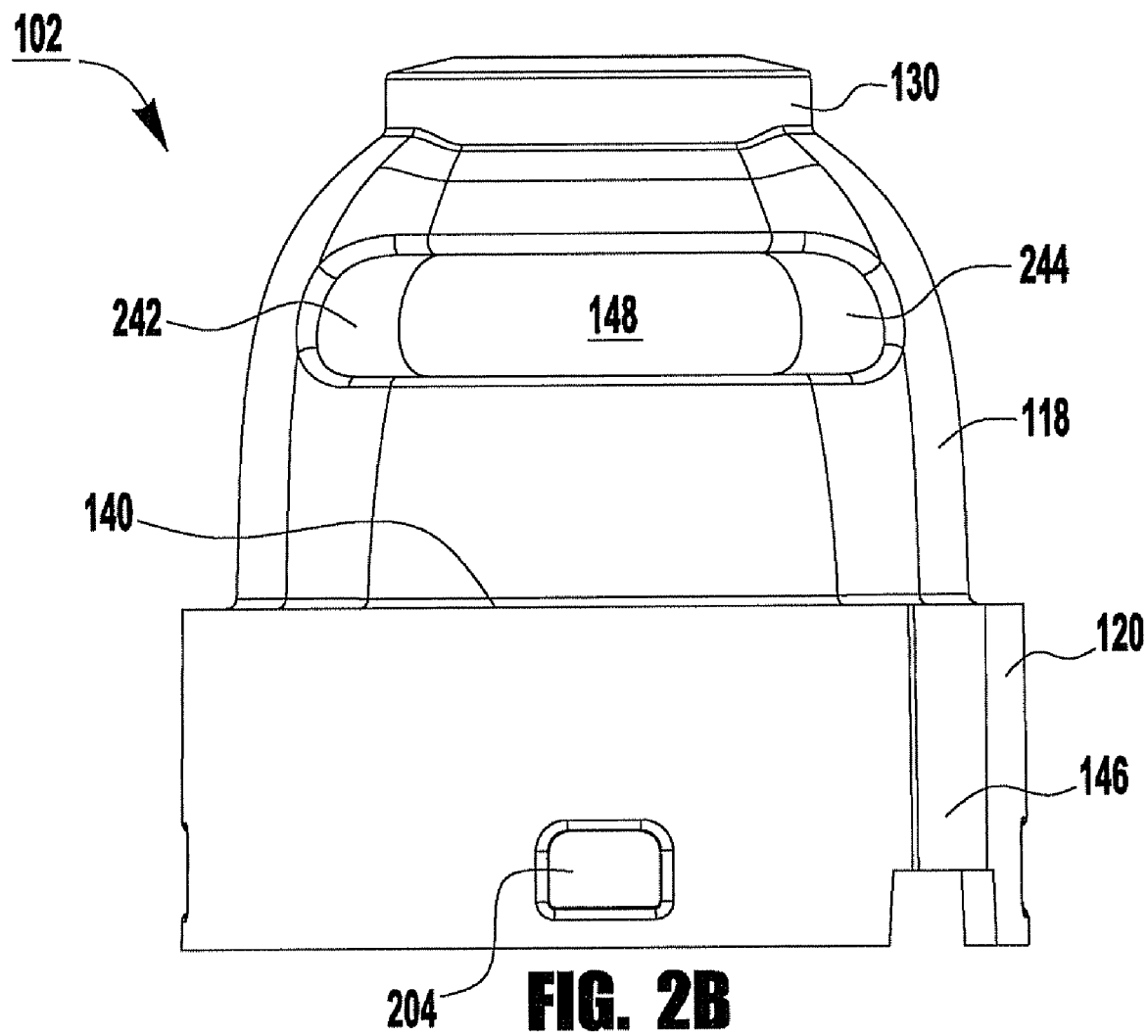

SECTION A-A

SECTION B-B

SECTION C-C

SECTION A-A

SECTION A-A

SECTION B-B

SECTION A-A

SECTION B-B

VALVE CARTRIDGE WITH INTEGRAL STOP

RELATED APPLICATION

The present application is being filed as a non-provisional patent application claiming priority under 35 U.S.C. §119(e) from, and any other benefit of, U.S. Provisional Patent Application No. 60/898,496 filed on Jan. 31, 2007, the entire disclosure of which is herein incorporated by reference.

FIELD

The invention relates generally to valve cartridges and, more particularly, to a valve cartridge having a housing that is used as a stop for an actuating mechanism of the valve cartridge.

BACKGROUND

Typically, for a plumbing fixture (e.g., a faucet, a tub spout, a shower head), a valve body conveys water flowing from a main water source to a desired destination (e.g., a sink, a tub, a basin). The valve body generally has two water inlet passages through which cold water and hot water from the main water source can respectively flow. The valve body also has a water outlet passage through which the cold water, the hot water or a mixture of the cold and hot water can be discharged to an outlet portion of the plumbing fixture (e.g., a spout). In a one-handle version of the valve body, the valve body has a cavity for receiving a valve cartridge which allows a user to control the flow rate and the temperature of the water flowing through the water inlet passages to the water outlet passage using a single valve actuating mechanism.

One type of (conventional) valve cartridge is a structural assembly including a housing in which two or more disks, plates or the like are disposed. The disks are generally made of a hard material (e.g., ceramic or metal). At least one of the disks (i.e., a fixed disk) is fixed relative to the housing. Another of the disks (i.e., a movable disk) is disposed above the fixed disk and is movable relative to the fixed disk. The valve cartridge includes the actuating mechanism that is directly or indirectly connected at one end to the movable disk. Another end of the actuating mechanism extends through an opening in the housing for manipulation by a user. The end of the actuating mechanism extending through the opening in the housing can be connected to a handle, knob or the like to assist the user in operating the valve cartridge.

In a one-handle version of this type of valve cartridge for use in the one-handle version of the valve body, the fixed disk includes two inlet openings (i.e., a cold water inlet opening and a hot water inlet opening) that substantially align with the water inlet passages of the valve body when the valve cartridge is installed in the valve body. Furthermore, the fixed disk includes an outlet opening that substantially aligns with the water outlet passage of the valve body when the valve cartridge is installed in the valve body. The actuating mechanism is connected to the movable disk via a coupling. The actuating mechanism can be pivoted to cause translational movement of the movable disk. The actuating mechanism can be rotated to cause angular movement of the movable disk.

In this manner, the movable disk can assume different positions relative to the fixed disk. In particular, pivoting of the actuating mechanism changes the flow rate of the water from zero to a maximum flow rate, whereas rotation of the actuating mechanism changes the temperature of the water. Accordingly, a one-handle actuating mechanism can control both the flow rate and the temperature of the water flowing through the valve cartridge.

The valve cartridge also includes one or more seals for preventing water from leaking out of the valve cartridge. The seals can be located, for example, below, between and/or above the disks in the valve cartridge. When the valve cartridge is installed in the valve body, a retention nut is generally used to secure the valve cartridge in the valve body. The retention nut engages an installation ledge of the housing of the valve cartridge such that the seals in the valve cartridge are compressed and, thus, apply a loading force to the components (including the disks) in the valve cartridge. Accordingly, the fixed disk and the movable disk are kept in water tight contact after installation of the valve cartridge in the valve body.

Typically, the conventional valve cartridge has structure that limits movement of the actuating mechanism, thereby defining the range of flow rates and/or temperatures of the water flowing through the valve cartridge. The conventional structure used to limit the movement (e.g., pivoting) of the actuating mechanism to define the range of flow rates includes a carrier, the movable disk or a bearing.

A carrier is an element disposed between the actuating mechanism and the movable disk. The carrier functions as the coupling that connects the actuating mechanism to the movable disk. Pivoting of the actuating mechanism results in linear movement of the carrier which, in turn, causes linear movement of the movable disk. An internal portion of the valve cartridge can be used to limit the linear movement of the carrier. For example, the carrier contacting an inner surface of a housing of the valve cartridge can limit the linear movement of the carrier. As a result, the movement of the actuating mechanism and the movable disk are also limited. In this manner, the inner surface of the housing limits the movement of the carrier and, thus, defines the range of flow rates of the valve cartridge.

Similarly, an internal portion of the valve cartridge can be used to limit the linear movement of the movable disk. For example, the movable disk can contact the inner surface of the housing of the valve cartridge. As a result, the movement of the actuating mechanism and the carrier (if present) are also limited. In this manner, the inner surface of the housing limits the movement of the movable disk and, thus, defines the range of flow rates of the valve cartridge.

A bearing (e.g., a journal bearing) disposed in the valve cartridge can also be used to limit the movement of the actuating mechanism to define the range of flow rates of the valve cartridge. The bearing can be a component of the actuating mechanism or some other discrete bearing in the valve cartridge. For example, the actuating mechanism can extend through an opening formed in the bearing so that it contacts opposing sides of the opening to define the range of flow rates.

As noted above, the conventional structure directly or indirectly limits the movement of the actuating mechanism to define the range of flow rates of the valve cartridge. The range of flow rates extends from a minimum flow rate corresponding to the valve cartridge being in a fully off state to a maximum flow rate corresponding to the valve cartridge being in a fully on state. The conventional structure, however, has several drawbacks.

If the carrier or the movable disk contacts the inner surface of the housing to limit the movement of the actuating mechanism and define the range of flow rates of the valve cartridge, the housing can become compromised (e.g., deformed) over time as a result of wear or from excessive loads being transferred from the actuating mechanism to the housing through the carrier or the movable disk. If the housing is compromised in the area of the carrier or the movable disk, the valve cartridge is prone to a failure resulting in leakage of the water flowing through the valve cartridge such that the valve cartridge can be rendered inoperable.

Furthermore, the carrier or the movable disk will contact the housing when the valve cartridge is in the fully on or the fully off position. In the fully on or the fully off position, the carrier or the movable disk can be rotated to adjust the temperature of the water, thereby resulting in increased wear as the carrier or the movable disk rubs against the housing.

Using the bearing to define the range of flow rates of the valve cartridge is also problematic. The bearing represents an additional part that needs to be manufactured, managed and maintained. Accordingly, the bearing increases an overall cost of the valve cartridge. Furthermore, the bearing further complicates the assembly process of the valve cartridge. As an additional part, the bearing introduces additional tolerances into the valve cartridge that can adversely affect the feel of the actuating mechanism during operation of the valve cartridge.

Consequently, there is a need in the art for a valve cartridge having integral structure that forms a stop for the actuating mechanism with a reduced risk of failure in a water flow path of the valve cartridge.

SUMMARY

In view of the above, it is an exemplary aspect to provide a valve cartridge having a housing that forms a stop for an actuating mechanism of the valve cartridge.

It is another exemplary aspect to provide a valve cartridge having a housing that directly contacts an actuating mechanism of the valve cartridge to limit movement of the actuating mechanism, thereby defining a range of flow rates of water flowing through the valve cartridge. The contact between the housing and the actuating mechanism can occur away from a wetted area of the valve cartridge. The range of flow rates can extend from a fully off state of the valve cartridge to a fully on state of the valve cartridge.

It is still another exemplary aspect to provide a valve cartridge having a housing that limits movement of the actuating mechanism of the valve cartridge to define a range of flow rates and a range of temperatures of water flowing through valve cartridge.

BRIEF DESCRIPTION OF THE DRAWINGS

The above aspects and additional aspects, features and advantages will become readily apparent by describing in detail exemplary embodiments thereof with reference to the attached drawings, wherein like reference numerals denote like elements, and:

FIGS. 2A-2E show an exemplary housing used in the exemplary valve cartridge of FIG. 1. FIG. 2A is a perspective view of the housing. FIG. 2B is a side elevational view of the housing. FIG. 2C is a cross-sectional view of the housing shown in FIG. 9A, along line A-A. FIG. 2D is a cross-sectional view of the housing shown in FIG. 9A, along line B-B. FIG. 2E is a cross-sectional view of the housing of FIG. 2C, along line C-C.

FIG. 4A is a perspective view of the spring. FIG. 4B is a plan view of the spring. FIG. 4C is a side elevational view of the spring.

FIG. 5A is a perspective view of the bushing. FIG. 5B is a side elevational view of the bushing. FIG. 5C is a bottom view of the bushing. FIG. 5D is a cross-sectional view of the bushing of FIG. 5C, along line A-A.

FIG. 6A is a perspective view of the flow plate. FIG. 6B is a plan view of the flow plate. FIG. 6C is a cross-sectional view of the flow plate of FIG. 6B, along line A-A. FIG. 6D is a cross-sectional view of the flow plate of FIG. 6B, along line B-B.

FIG. 8A is a top perspective view of the base seal. FIG. 8B is a bottom perspective view of the base seal.

FIG. 9A is a plan view of the valve cartridge in assembled form. FIG. 9B is a cross-sectional view of the valve cartridge of FIG. 9A, along line A-A. FIG. 9C is a cross-sectional view of the valve cartridge of FIG. 9A, along line B-B.

DETAILED DESCRIPTION

Figure 1:
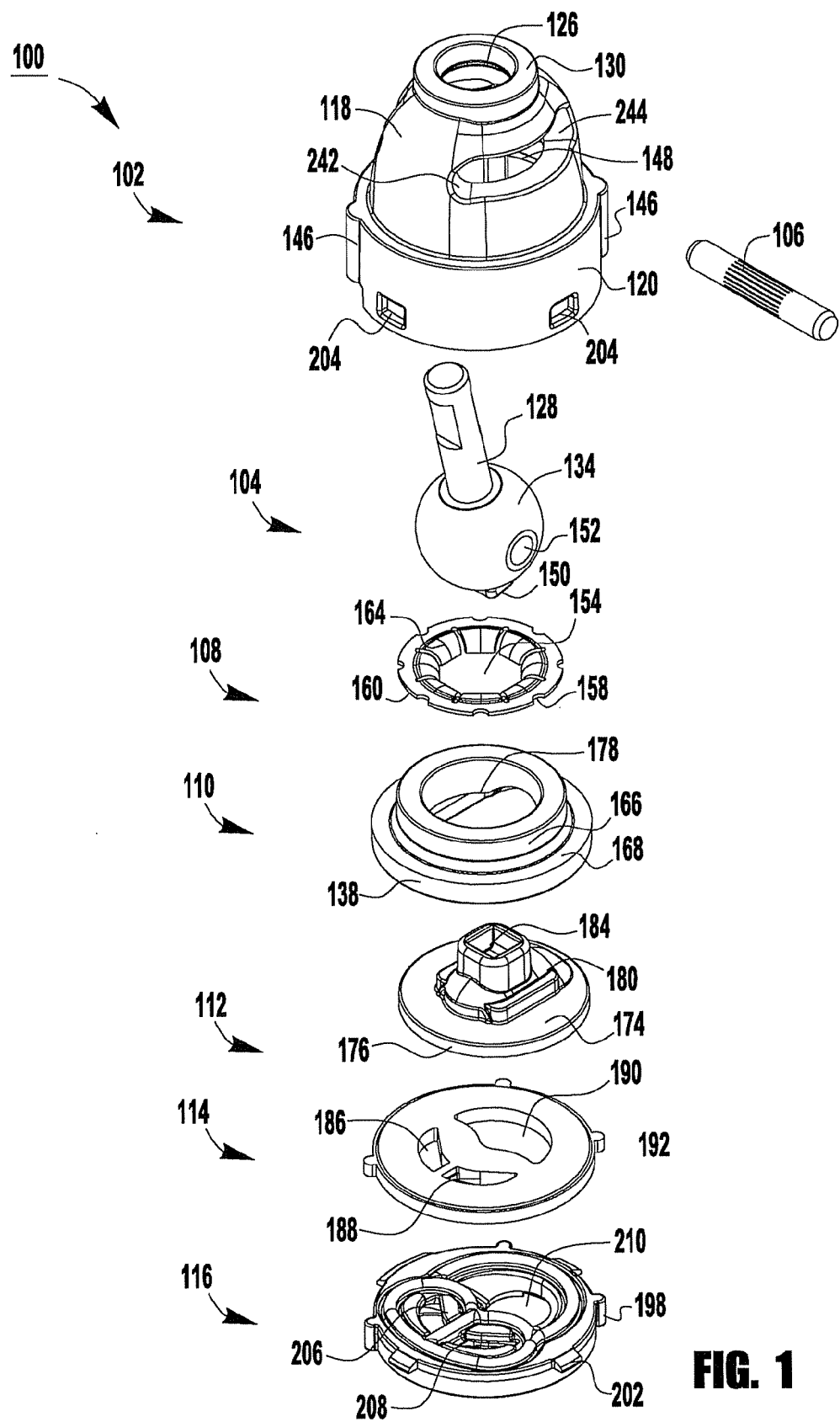
FIG. 1 is a perspective exploded view of a valve cartridge, according to an exemplary embodiment.
Figure 2A:
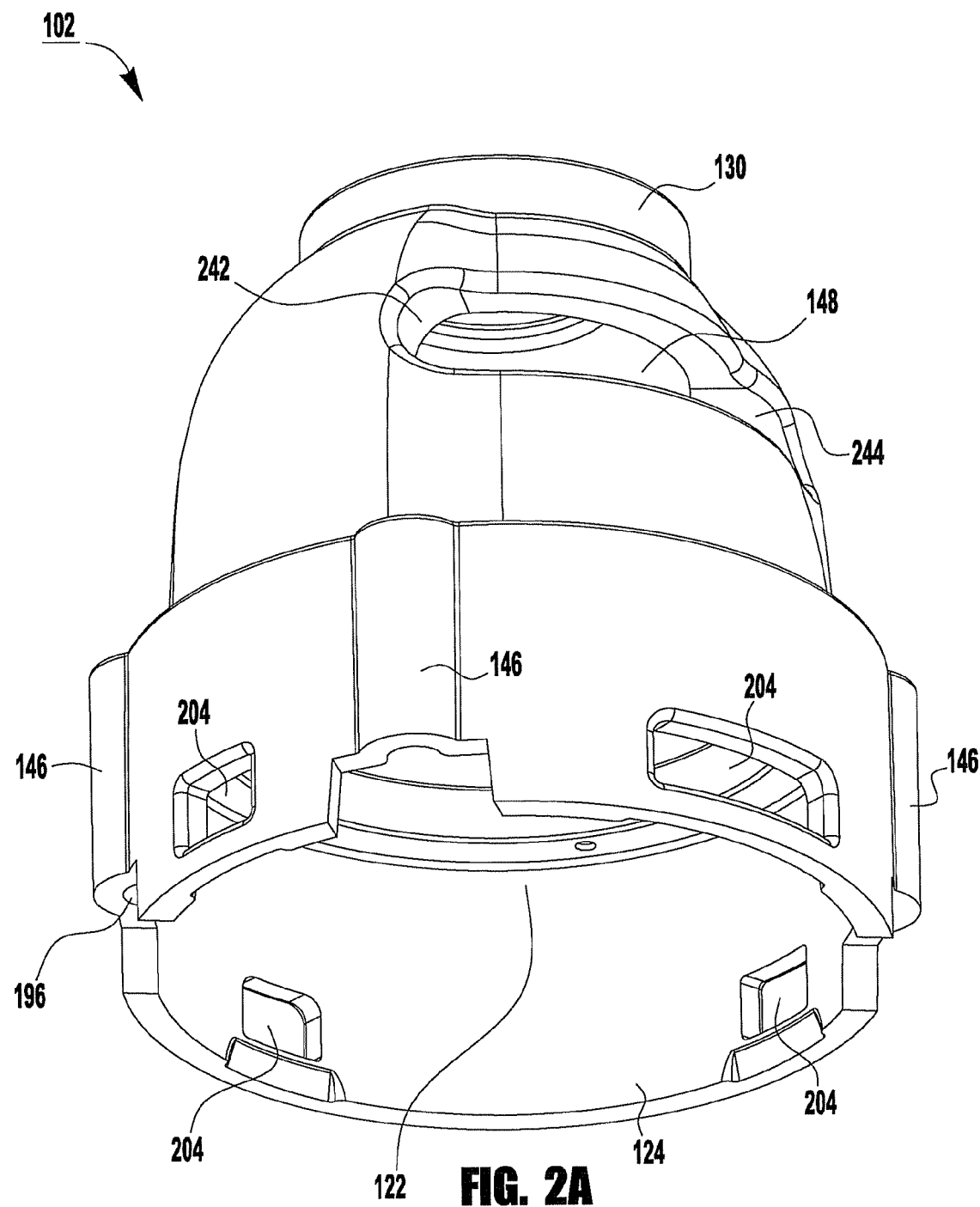
Figure 2C:
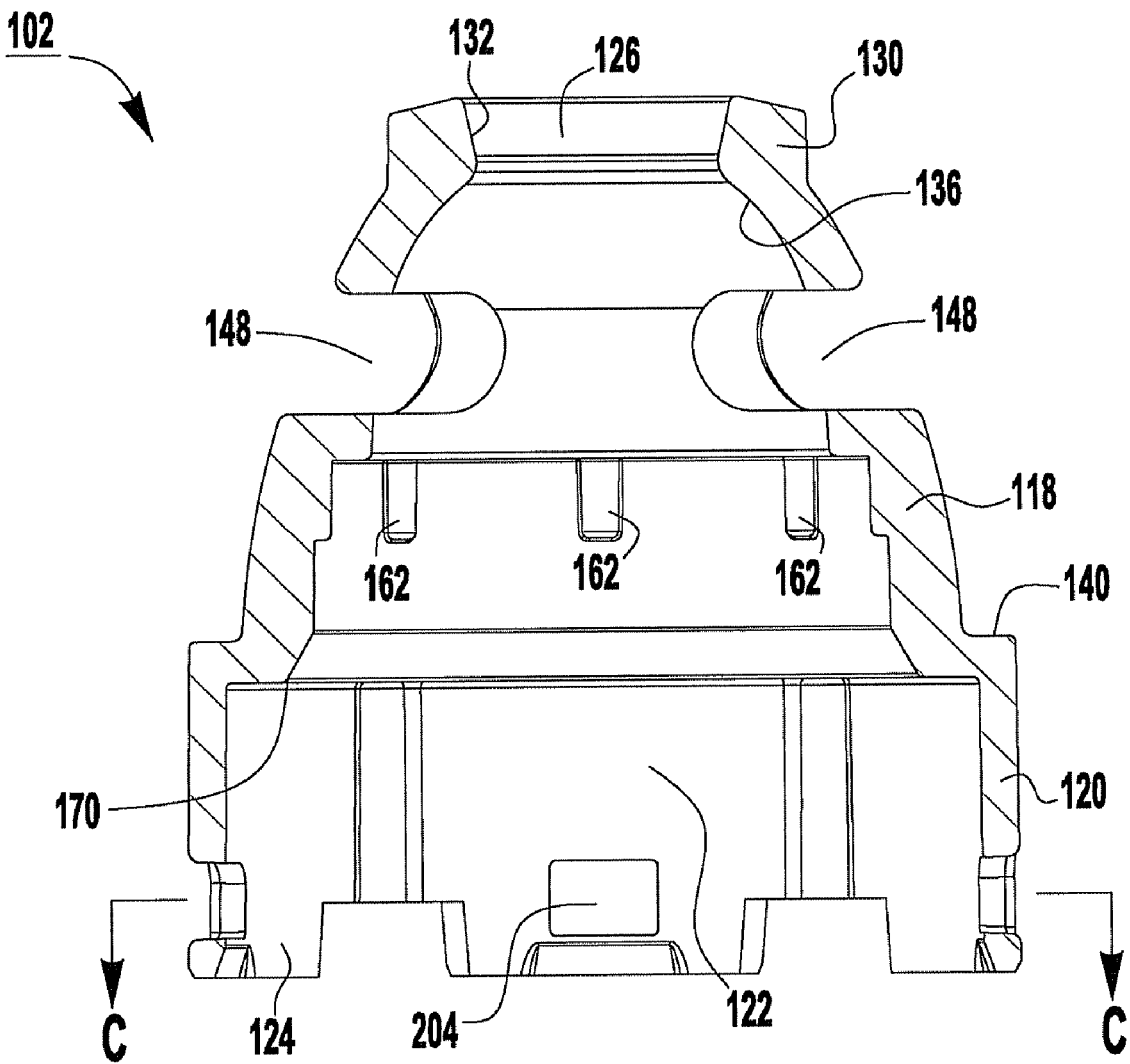
Figure 2D:
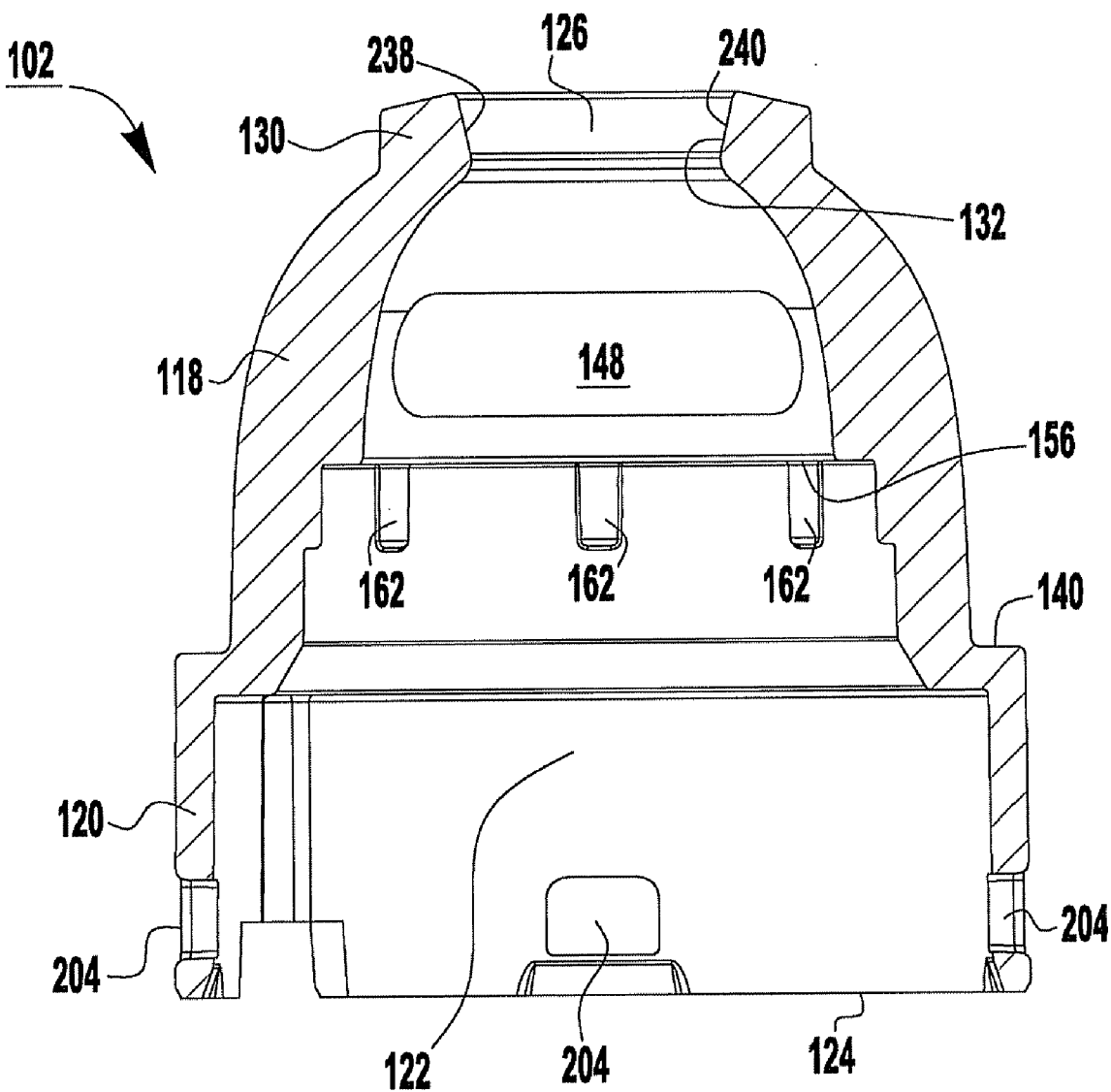
Figure 2E:
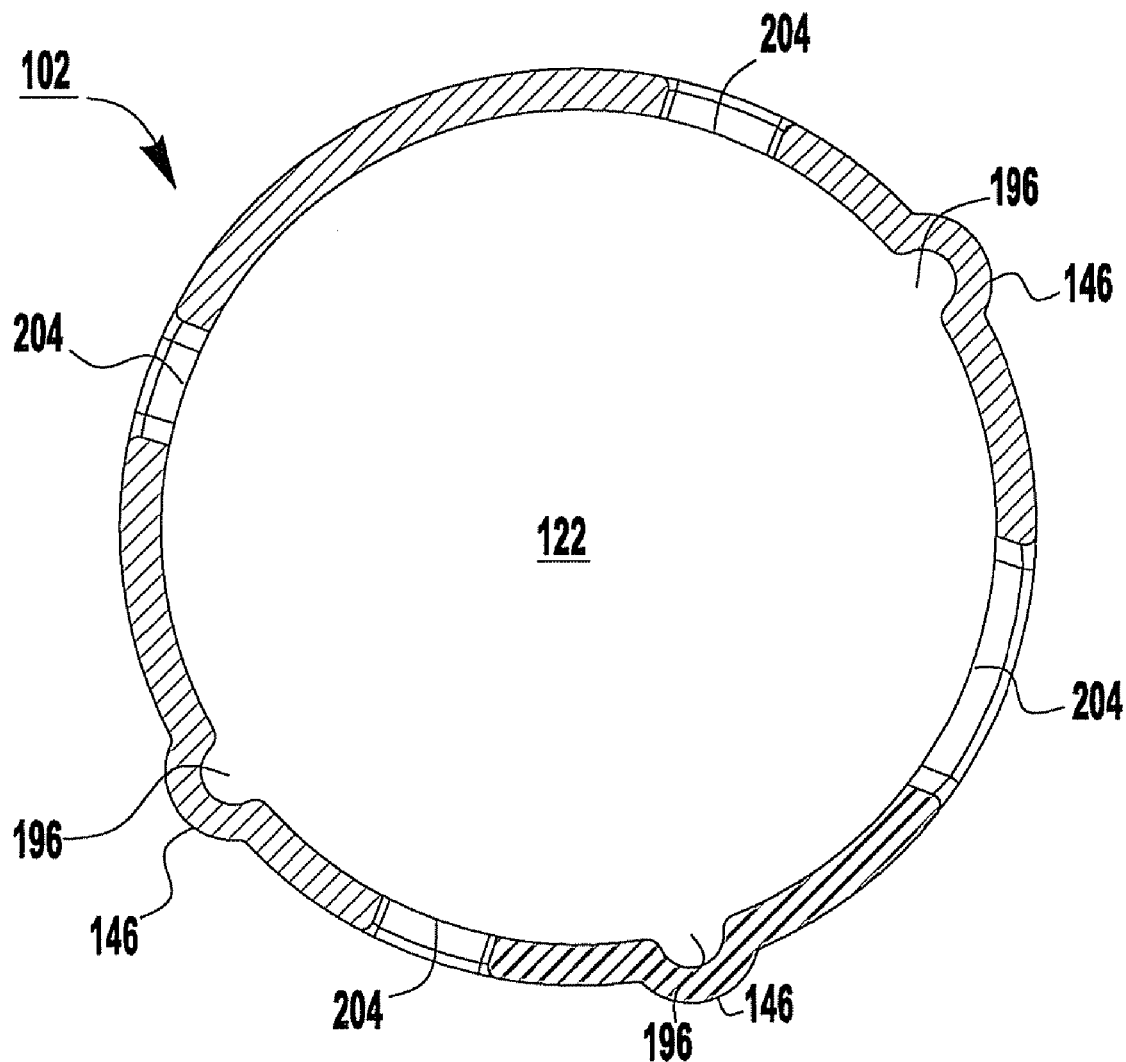

While the general inventive concept is susceptible of embodiment in many different forms, there are shown in the drawings and will be described herein in detail specific embodiments thereof with the understanding that the present disclosure is to be considered as an exemplification of the principles of the general inventive concept. Accordingly, the general inventive concept is not intended to be limited to the specific embodiments illustrated herein.

A one-handle valve cartridge 100, according to an exemplary embodiment, has integral structure that forms a stop for an actuating mechanism of the valve cartridge 100 with a reduced risk of failure in a water flow path of the valve cartridge 100. Accordingly, the valve cartridge 100 may overcome various drawbacks of conventional valve cartridges having structure that limits movement of an actuating mechanism.

As shown in FIGS. 1 and 9A-9C, the exemplary valve cartridge 100 has several discrete components including a housing 102, a ball-stem 104, a pin 106, a spring 108, a bushing 110, a flow plate 112, a manifold 114 and a base seal 116. The flow plate 112 and/or the manifold 114 can be made of a hard material. For example, the flow plate 112 and/or the manifold 114 can be made of stainless steel. The housing 102, for example, can be made of plastic or metal.

In another exemplary embodiment, the flow plate 112 is replaced by a carrier (not shown) and a movable disk (not shown), and the manifold 114 is replaced by a fixed disk (not shown) and a lower housing (not shown). The movable disk and/or the fixed disk can be made of ceramic.

As shown in FIGS. 2A-2E, the housing 102 has a domed portion 118 and a cylindrical portion 120. A cavity 122 is formed in the housing 102 for receiving the remaining components of the valve cartridge 100. The cavity 122 extends inside the domed portion 118 and the cylindrical portion 120 of the housing 102. The cylindrical portion 120 of the housing 102 includes a lower opening 124 through which the components can be inserted into the housing 102. The domed portion 118 of the housing 102 includes an upper opening 126 through which a stem portion 128 of the ball-stem 104 extends.

A raised collar 130 is formed integrally with the housing 102 near the upper opening 126 of the housing 102. The raised collar 130 can have an annular shape. The raised collar 130 surrounds the upper opening 126, such that the stem portion 128 of the ball-stem 104 extends through the raised collar 130. The raised collar 130 has an inner surface 132 that is sloped to conform to an angle of the stem portion 128 when the stem portion 128 contacts the inner surface 132 of the raised collar 130 (see FIGS. 9C and 10). In one exemplary embodiment, the inner surface 132 of the raised collar 130 has a slope between 0.5 degrees and 25 degrees relative to a longitudinal axis of the housing 102. In another exemplary embodiment, the inner surface 132 of the raised collar 130 has a slope of approximately 12.5 degrees relative to a longitudinal axis of the housing 102.

The cavity 122 in the housing 102 is wider near the lower opening 124 than near the upper opening 126. A portion of the cavity 122 near the upper opening 126 of the housing 102 receives a ball portion 134 of the ball-stem 104. Accordingly, a first inner surface 136 of the portion of the cavity 122 near the upper opening 126 has a shape that substantially conforms to a shape of the ball portion 134 of the ball-stem 104 (see FIGS. 9B-9C and 10).

A portion of the cavity 122 near the lower opening 124 of the housing 102 receives the bushing 110, the flow plate 112, the manifold 114 and the base seal 116. A diameter of the cavity 122 near the lower opening 124 is substantially the same as a diameter of the base seal 116, the manifold 114 and a flat annular portion 138 of the bushing 110, such that only a small gap is present between these components and the housing 102 when the components are received in the housing 102.

A portion of the housing 102 where the domed portion 118 meets the cylindrical portion 120 forms an installation ledge 140 on an outer surface of the housing 102. A retention nut 142 engages the installation ledge 140 to secure the valve cartridge 100 in a valve body 144 (see FIG. 10). Furthermore, the housing 102 has one or more keys 146 that each engage a complementary-shaped recess (not shown) in the valve body 144 to prevent rotation of the housing 102 relative to the valve body 144 after the valve cartridge 100 is installed. The one or more keys 146 can have a lobular shape. The housing 102 also includes a pair of slots 148 formed on opposing sides of the housing 102 that interface with distal ends of the pin 106 to function as temperature-limit stops, as described below.

Figure 3:
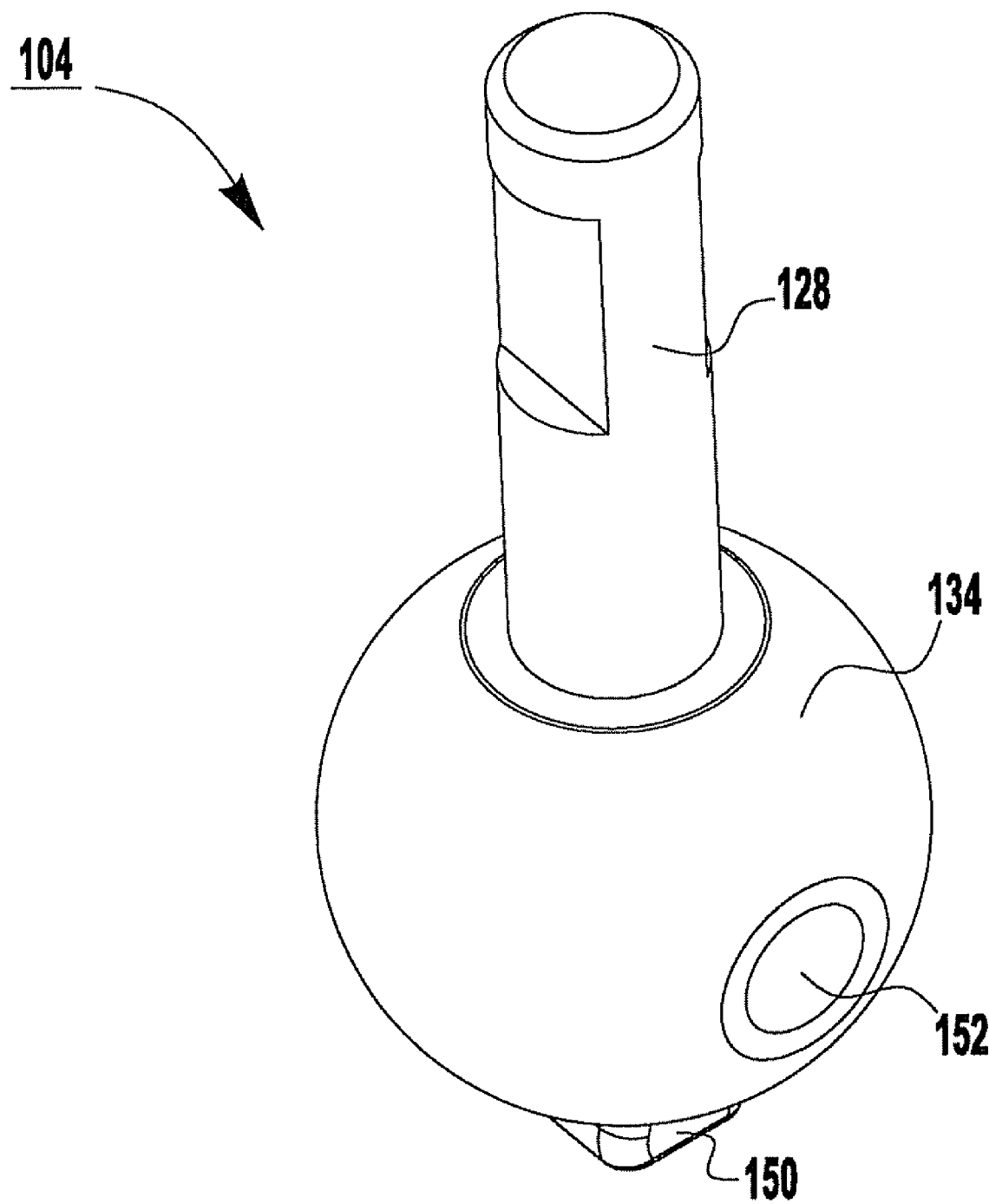
FIG. 3 is a perspective view of an exemplary ball-stem of the exemplary valve cartridge of FIG. 1.

As shown in FIG. 3, the ball-stem 104, along with the pin 106 (see FIG. 1), is the actuating mechanism for the valve cartridge 100. The ball-stem 104 includes the ball portion 134 and the stem portion 128. The ball portion 134 and the stem portion 128 can be discrete components or can be formed integrally. The ball portion 134 includes a projection 150 extending from a side of the ball portion 134 that is opposite a side of the ball portion 134 from which the stem portion 128 extends. The projection 150 acts as a coupling device for connecting the ball-stem 104 to the flow plate 112, as described below. The ball portion 134 and the projection 150 can be discrete components or can be formed integrally.

A bore 152 is formed through a center of the ball portion 134 of the ball-stem 104. The bore 152 is orthogonal to the stem portion 128 of the ball-stem 104. After the ball-stem 104 is inserted into the cavity 122 of the housing 102, the pin 106 can be inserted through one of the slots 148 in the housing 102 and into the bore 152 of the ball-stem 104. In this manner, the pin 106 retains the ball-stem 104 in the housing 102.

Figure 4A:
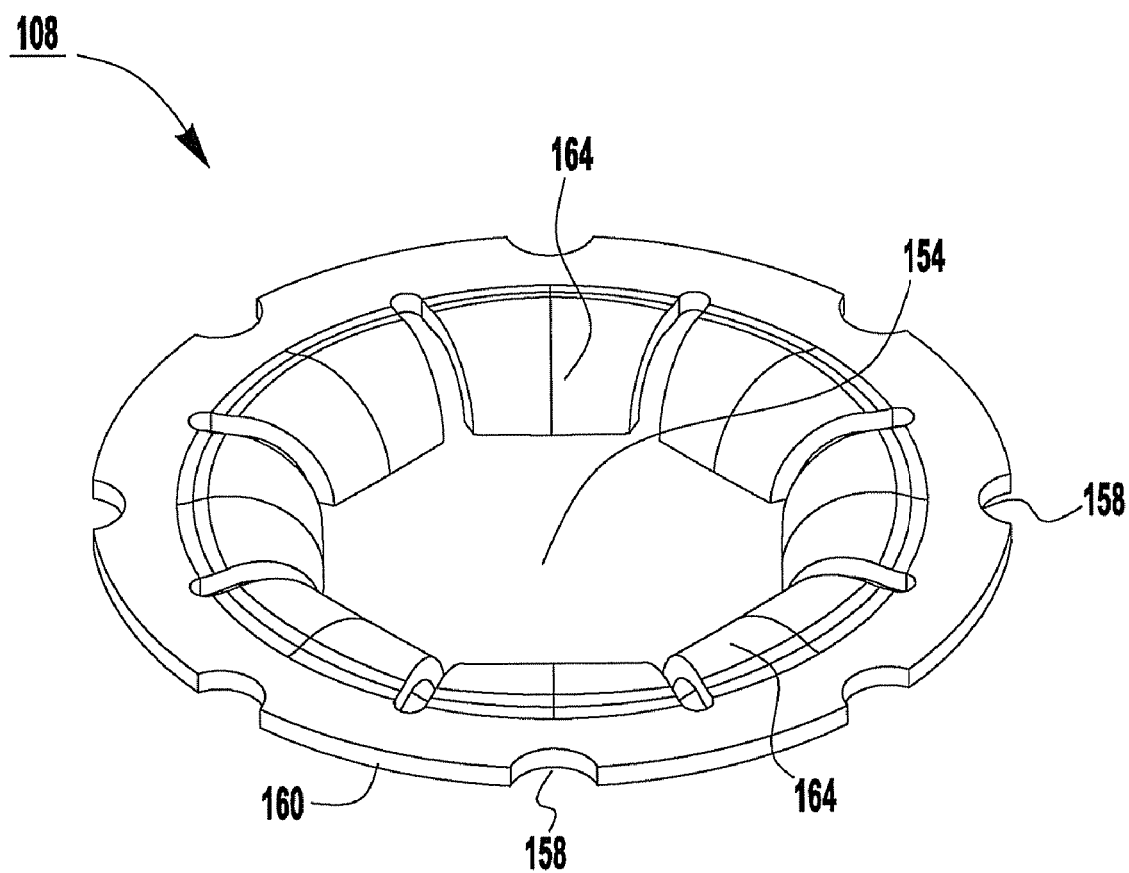
FIGS. 4A-4C show an exemplary spring used in the exemplary valve cartridge of FIG. 1.
Figure 4B:
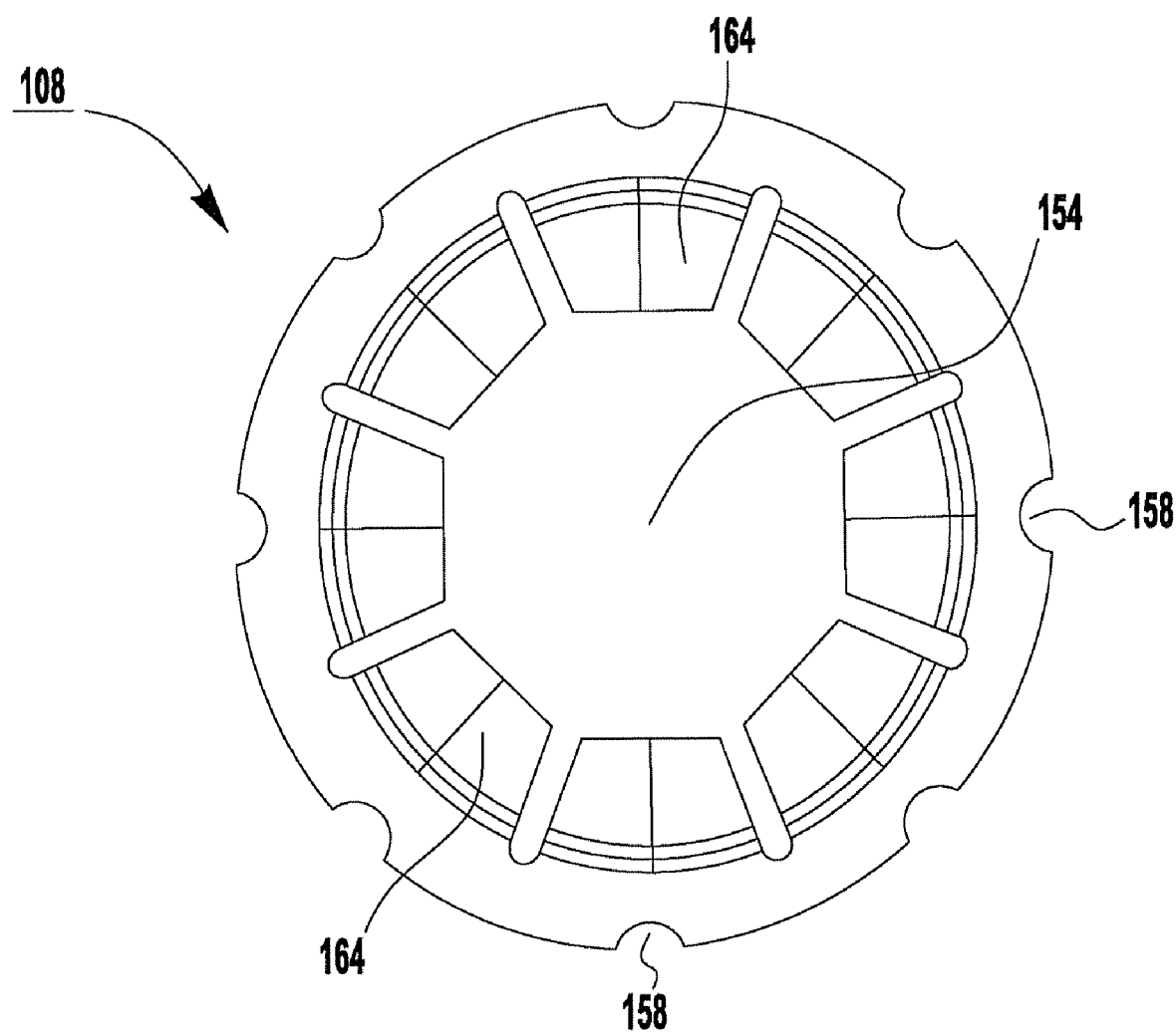
Figure 4C:
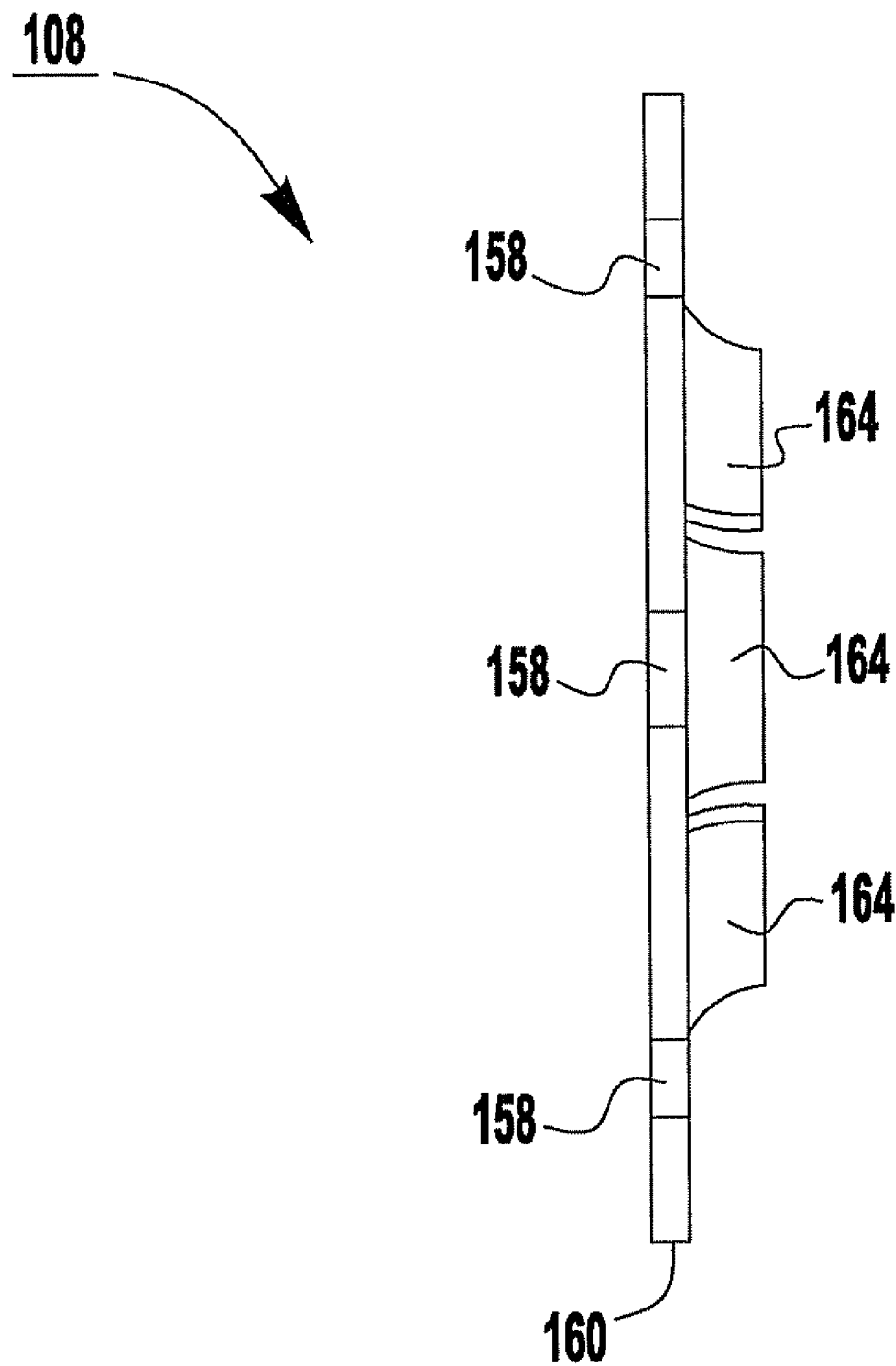
Figure 5A:
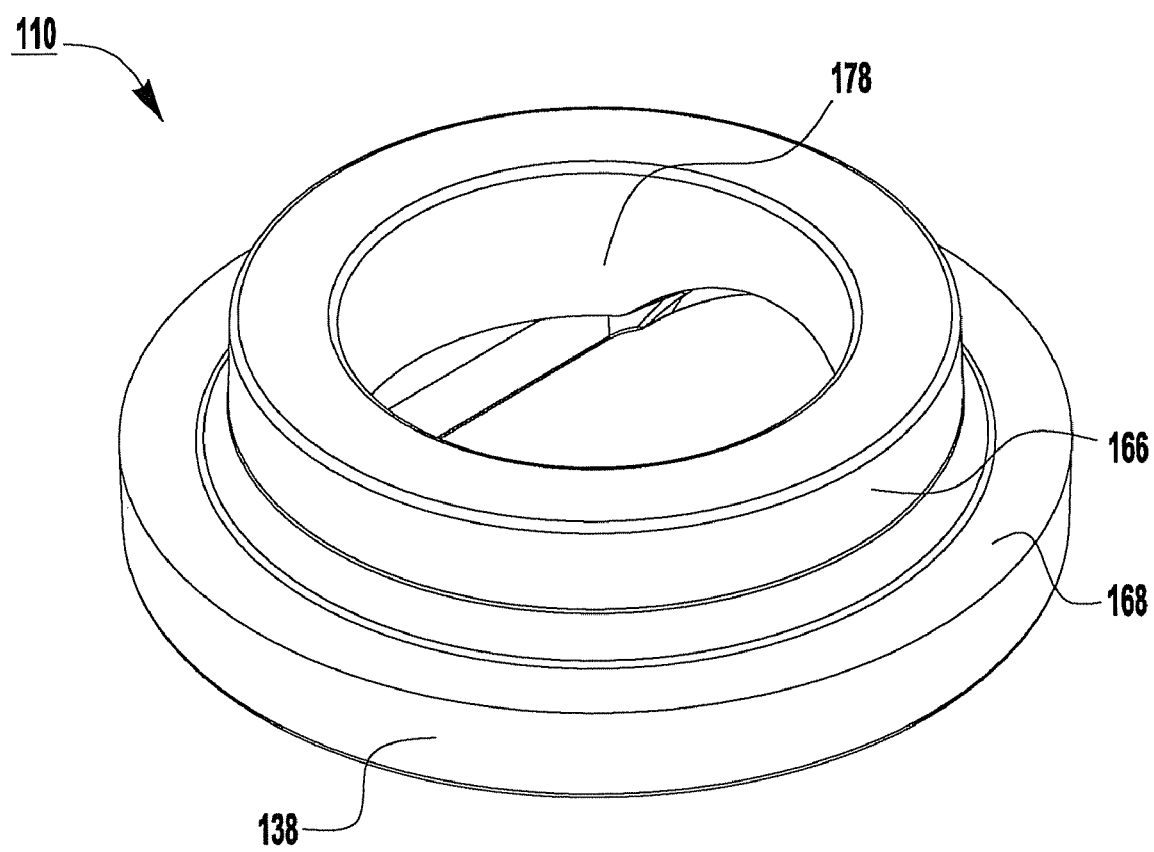
FIGS. 5A-5D show an exemplary bushing used in the exemplary valve cartridge of FIG. 1.
Figure 5B:
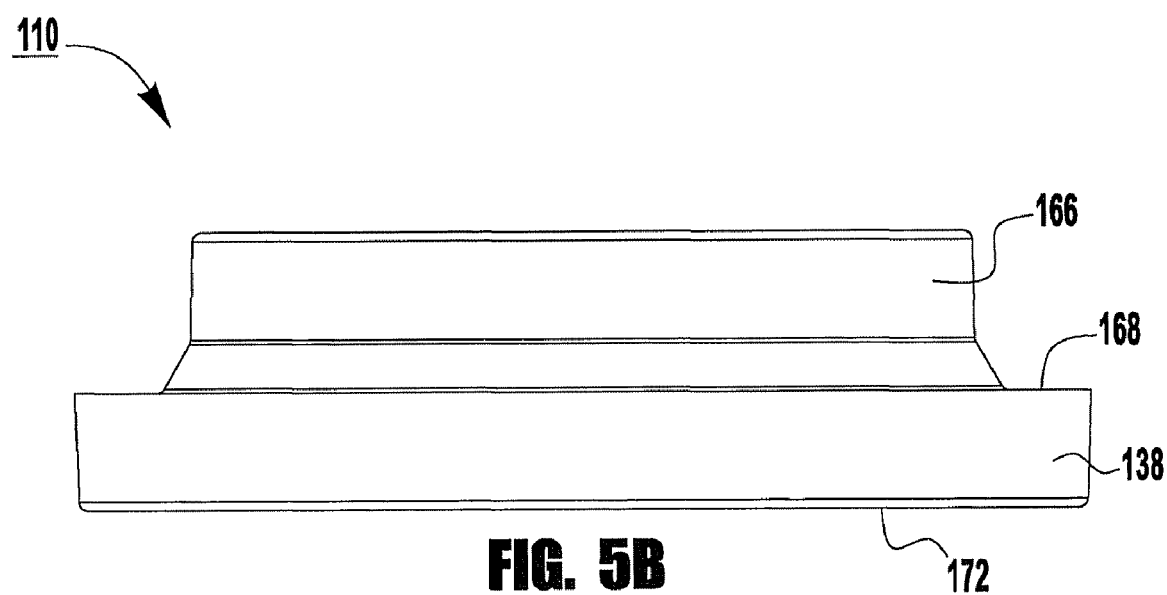
Figure 5C:
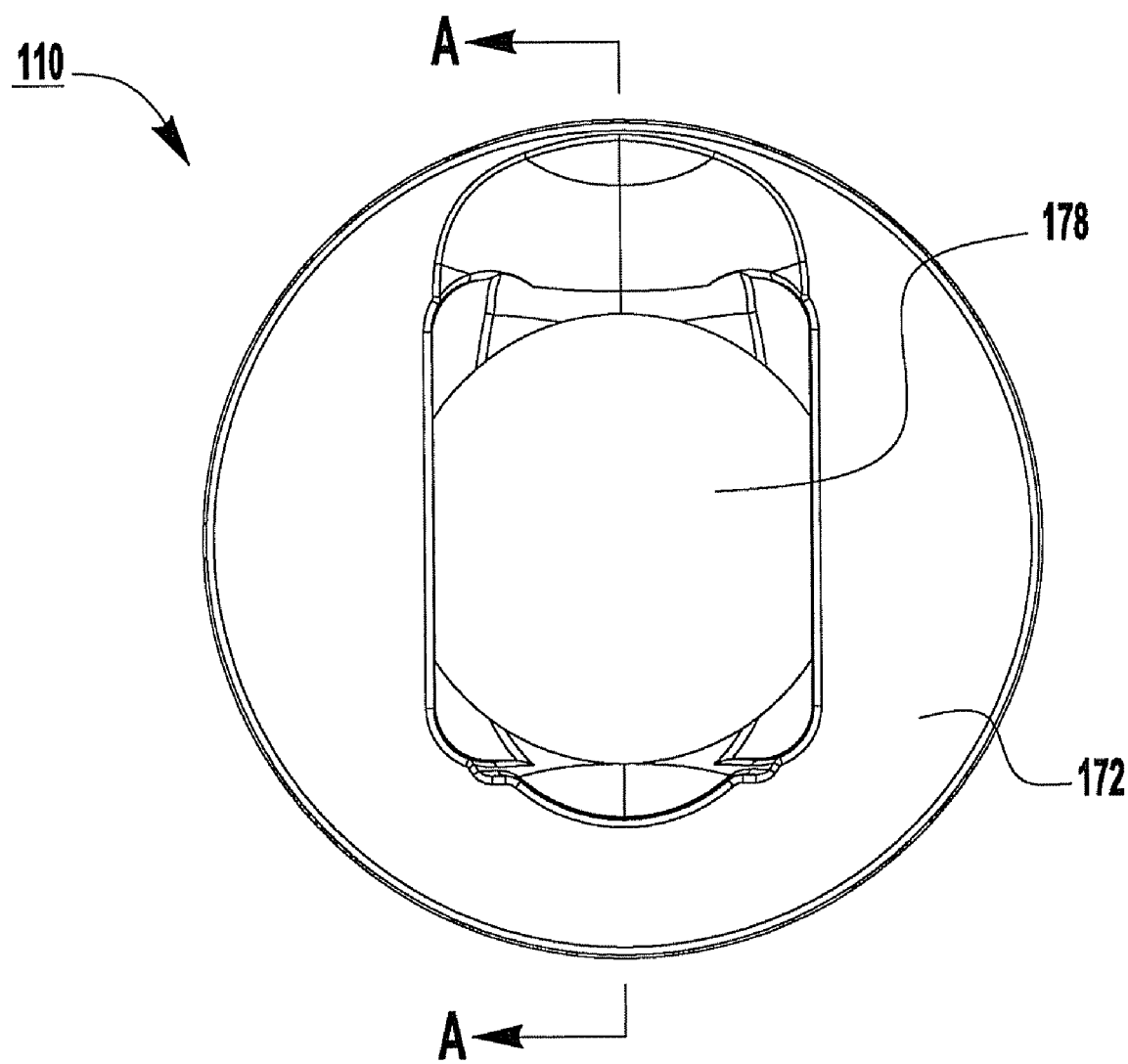
Figure 5D:
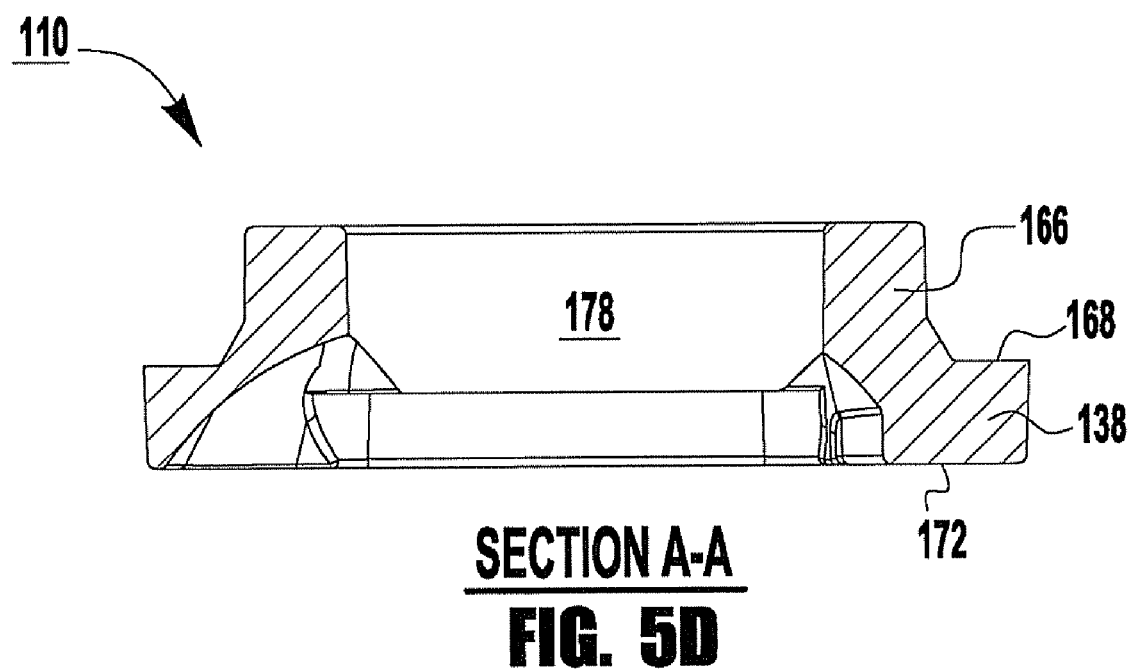
Figure 6A:
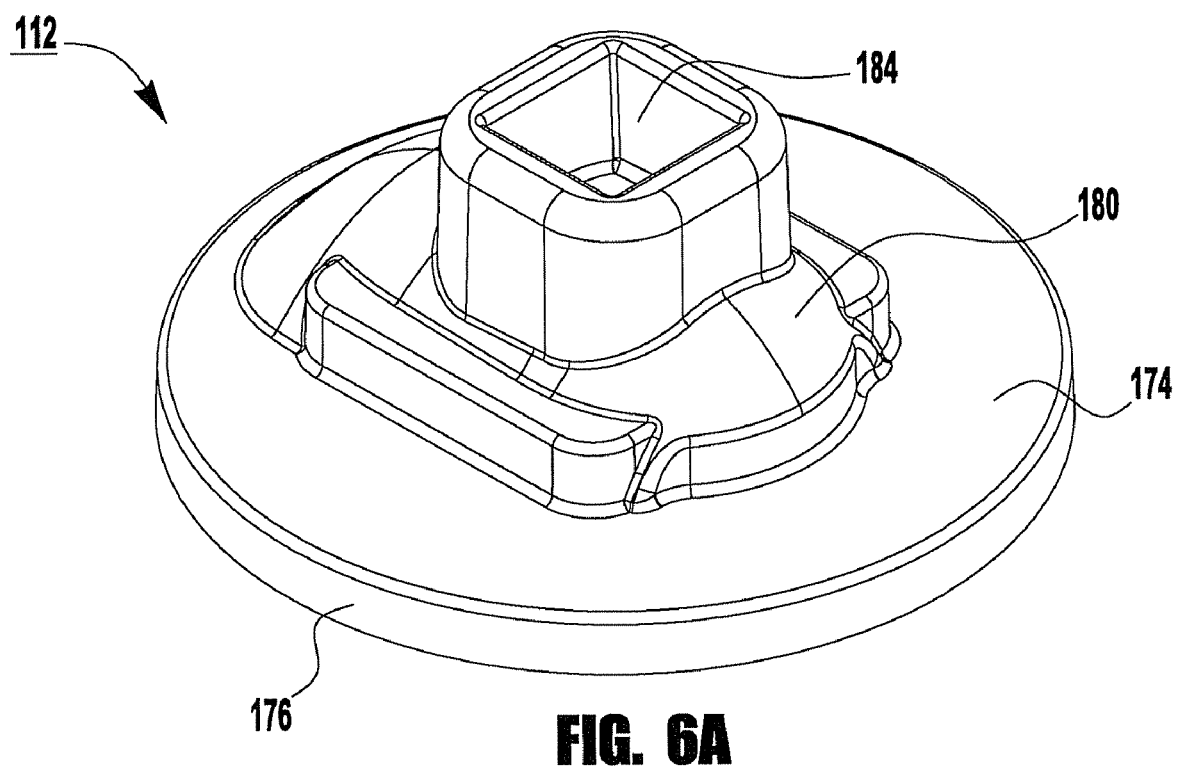
FIGS. 6A-6D show an exemplary flow plate used in the exemplary valve cartridge of FIG. 1.
Figure 6B:
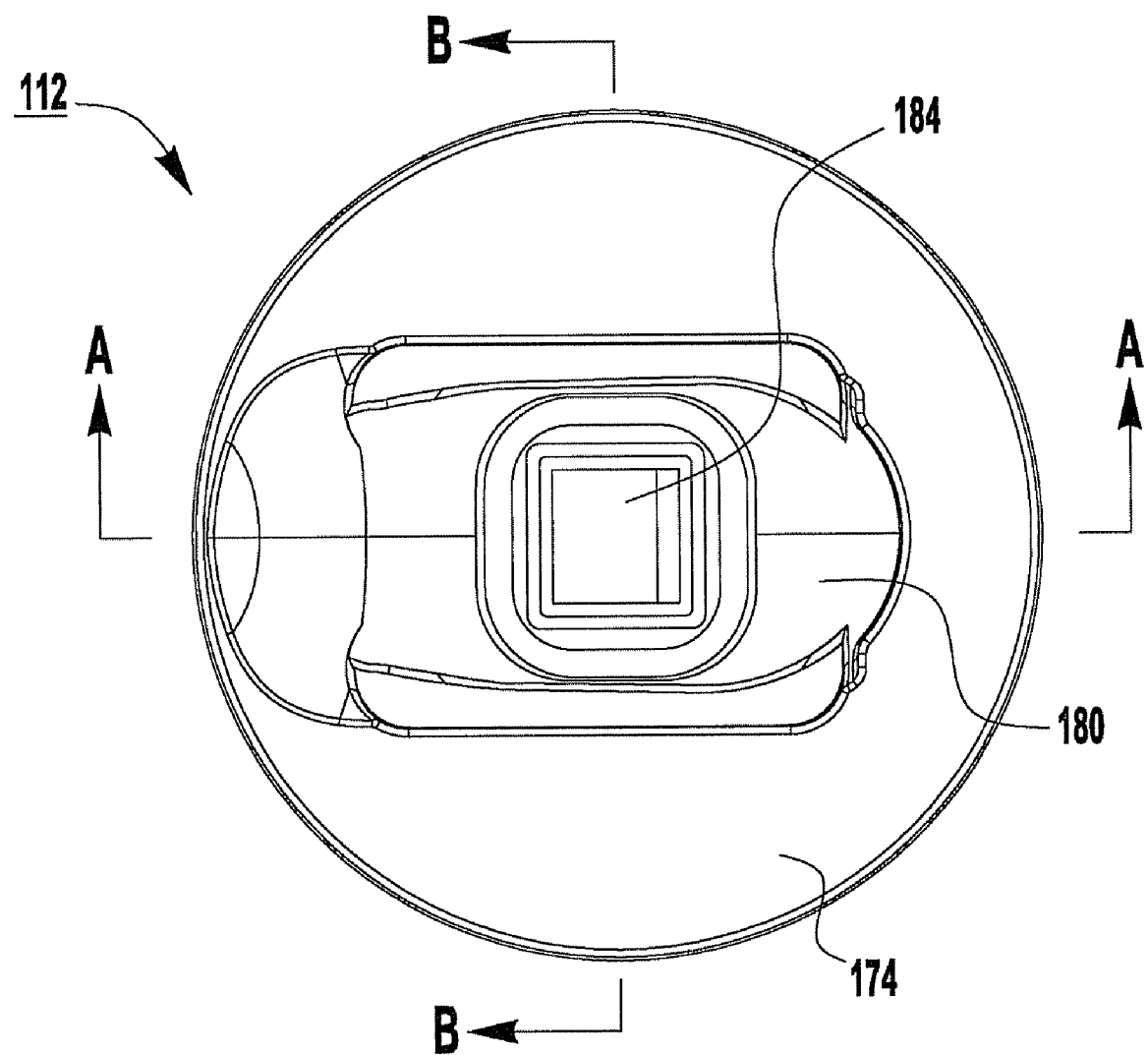
Figure 6C:
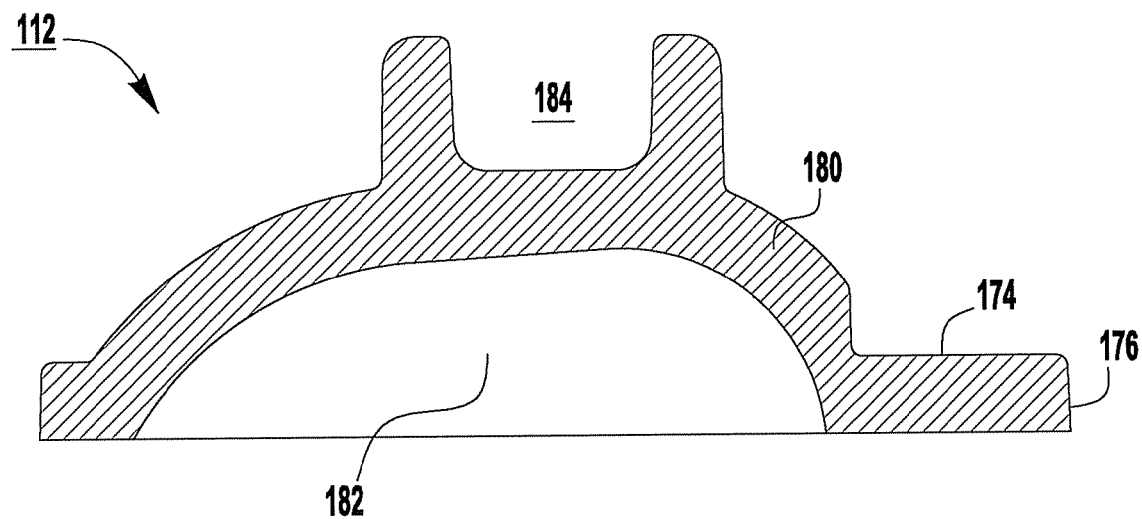
Figure 6D:
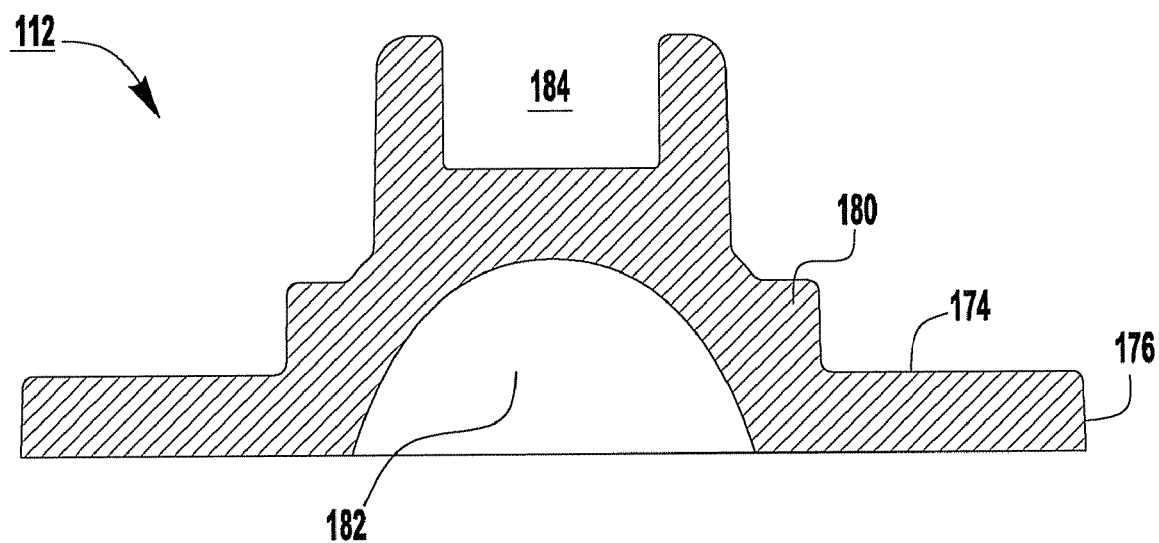

As shown in FIGS. 4A-4C, the spring 108 has an annular shape with a central opening 154. The spring 108 is disposed below the ball portion 134 of the ball-stem 104 in the housing 102 (see FIGS. 9B-9C). The spring 108 is connected to a second inner surface 156 of the housing 102 (e.g., by or through threading, friction fitting, snap fitting, welding), such that the spring 108 also retains the ball-stem 104 in the housing 102. The spring 108 has a plurality of notches 158 formed on an outer periphery 160 of the spring 108. The notches 158 engage corresponding tabs 162 formed on the second inner surface 156 of the housing 102 (see FIG. 2C), thereby securing the spring 108 within the housing 102 below the ball-stem 104.

The projection 150 of the ball-stem 104 extends through the central opening 154 in the spring 108. Some of the ball portion 134 of the ball-stem 104 can also extend through the central opening 154 in the spring 108. The spring 108 includes a plurality of elastic flanges 164 surrounding the central opening 154. The elastic flanges 164 of the spring 108 contact the ball portion 134 of the ball-stem 104 and urge the ball portion 134 of the ball-stem 104 against the complementary-shaped first inner surface 136 of the housing 102.

As shown in FIGS. 5A-5D, the bushing 110 includes the flat annular portion 138 and a raised annular portion 166. A diameter of the flat annular portion 138 is greater than a diameter of the raised annular portion 166. The bushing 110 is disposed below and can be spaced apart from the spring 108 in the cavity 122 of the housing 102 (see FIGS. 9B-9C). An upper surface 168 of the flat annular portion 138 of the bushing 110 contacts a third inner surface 170 of the housing 102, which is located below the installation ledge 140 (see FIGS. 2C-2D and 9B-9C). A lower surface 172 of the flat annular portion 138 of the bushing 110 rests on an upper surface 174 of a flat portion 176 of the flow plate 112. Additionally, the raised annular portion 166 of the bushing 110 extends into a portion of the cavity 122 of the housing 102 immediately above the installation ledge 140. The raised annular portion 166 of the bushing 110 is sized to fit closely in that portion of the cavity 122 of the housing 102 receiving the raised annular portion 266 of the bushing 110. Accordingly, the bushing 110 provides a support surface between the housing 102 and the flow plate 112.

The bushing 110 has an opening 178 that extends through the flat annular portion 138 and the raised annular portion 166 of the bushing 110. A raised portion 180 of the flow plate 112 extends into the opening 178 of the bushing 110. The raised portion 180 of the flow plate 112 forms a mixing chamber 182. A portion of the opening 178 of the bushing 110 has an inner surface shaped to conform to a shape of the raised portion 180 of the flow plate 112 (see FIGS. 5C-5D). Additionally, a coupling recess 184 is formed on the raised portion 180 of the flow plate 112 (see FIGS. 6A-6D). After the flow plate 112 is installed in the valve cartridge 100, the coupling recess 184 is positioned within the opening 178 of the bushing 110 and surrounded by the raised annular portion 166 of the bushing 110 (see FIGS. 9B-9C).

The coupling recess 184 of the flow plate 112 receives the projection 150 of the ball-stem 104, thereby connecting the actuating mechanism (e.g., the ball-stem 104) and the flow plate 112. The projection 150 of the ball-stem 104 can have four sides that contact four corresponding sides of the coupling recess 184. It will be appreciated that notwithstanding the exemplary embodiments described herein, the ball-stem 104 can be connected to the flow plate 112 in any suitable manner that allows the ball-stem 104 to impart translational and angular movement to the flow plate 112.

As shown in FIGS. 6A-6D, the flow plate 112 is a valve member formed as a plate, disk or the like that is movable relative to the housing 102. The flow plate 112 includes the flat portion 176 and the raised portion 180. The flat portion 176 of the flow plate 112 forms a sealing surface that can cover and uncover water inlet apertures 186 and 188 in the manifold 114 to allow only cold water, only hot water or both cold and hot water to flow through the manifold 114. The water flowing through the water inlet apertures 186 and 188 in the manifold 114 enters the mixing chamber 182 (i.e., a cavity formed under the raised portion 180 of the flow plate 112) where the cold and hot water mixes prior to being discharged through a water outlet aperture 190 in the manifold 114. Furthermore, as noted above, the flow plate 112 also includes the coupling recess 184, which is formed on the raised portion 180 of the flow plate 112.

Figure 7:
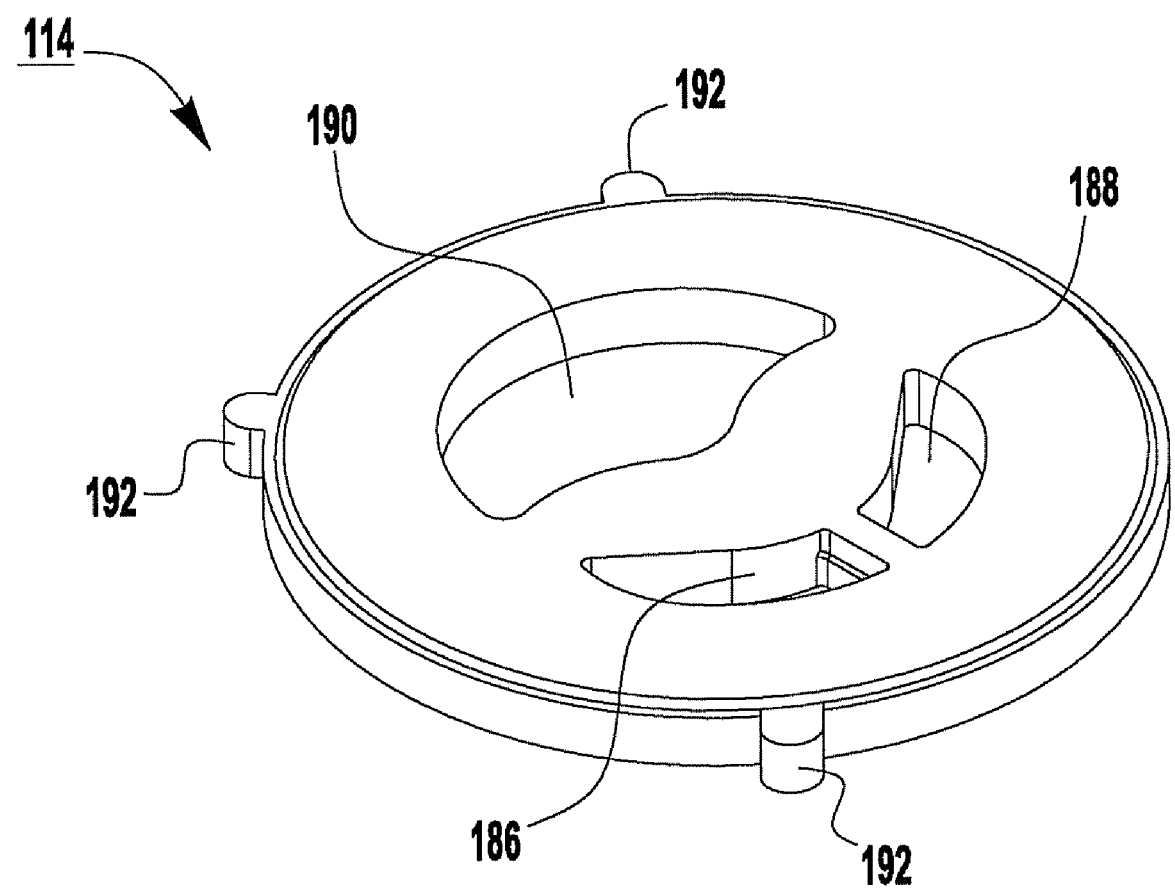
FIG. 7 is a perspective view of an exemplary manifold of the exemplary valve cartridge of FIG. 1.

As shown in FIG. 7, the manifold 114 is a valve member formed as a plate, disk or the like that is fixed relative to the housing 102. The manifold 114 includes one or more projections 192 formed on a periphery 194 of the manifold 114, wherein each of the projections 192 fits inside an internal cavity 196 of one of the keys 146 of the housing 102 (see FIGS. 2A and 2E). The projections 192 fix the manifold 114 relative to the housing 102, thereby preventing rotation of the manifold 114 within the housing 102.

The manifold 114 includes the water inlet apertures 186 and 188, which correspond to a cold water inlet aperture and a hot water inlet aperture, respectively. The manifold 114 also includes the water outlet aperture 190 through which cold water flowing through the cold water inlet aperture 186, hot water flowing through the hot water inlet aperture 188 or a mixture of the cold and hot water can flow to a water outlet passage (not shown) of the valve body 144.

Figure 8A:
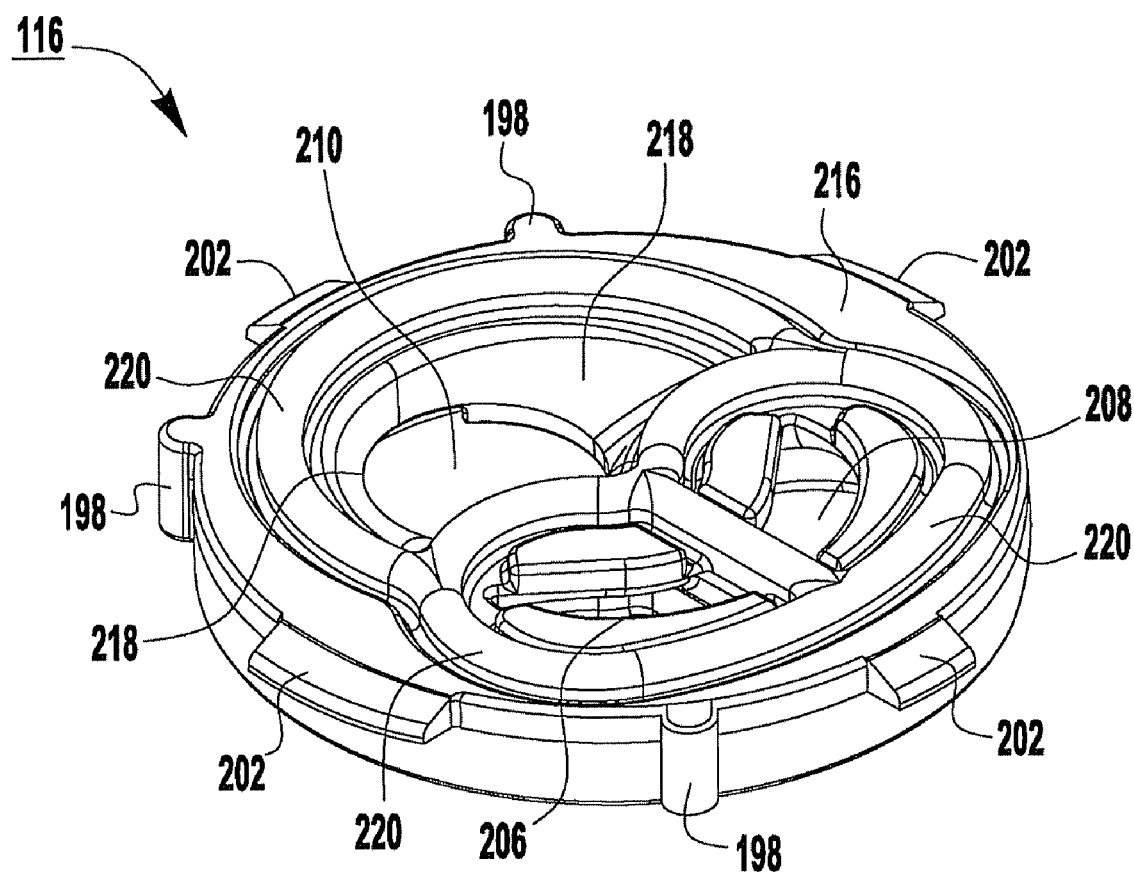
FIGS. 8A-8B show an exemplary base seal used in the exemplary valve cartridge of FIG. 1.
Figure 8B:
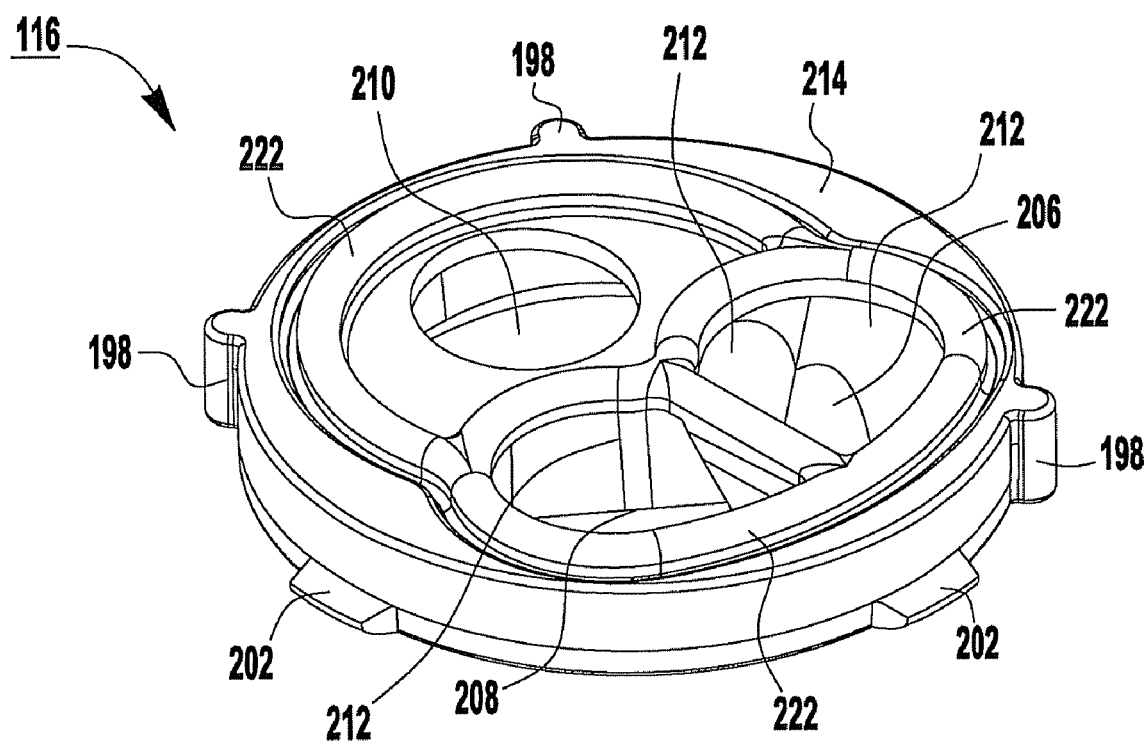
Figure 9A:
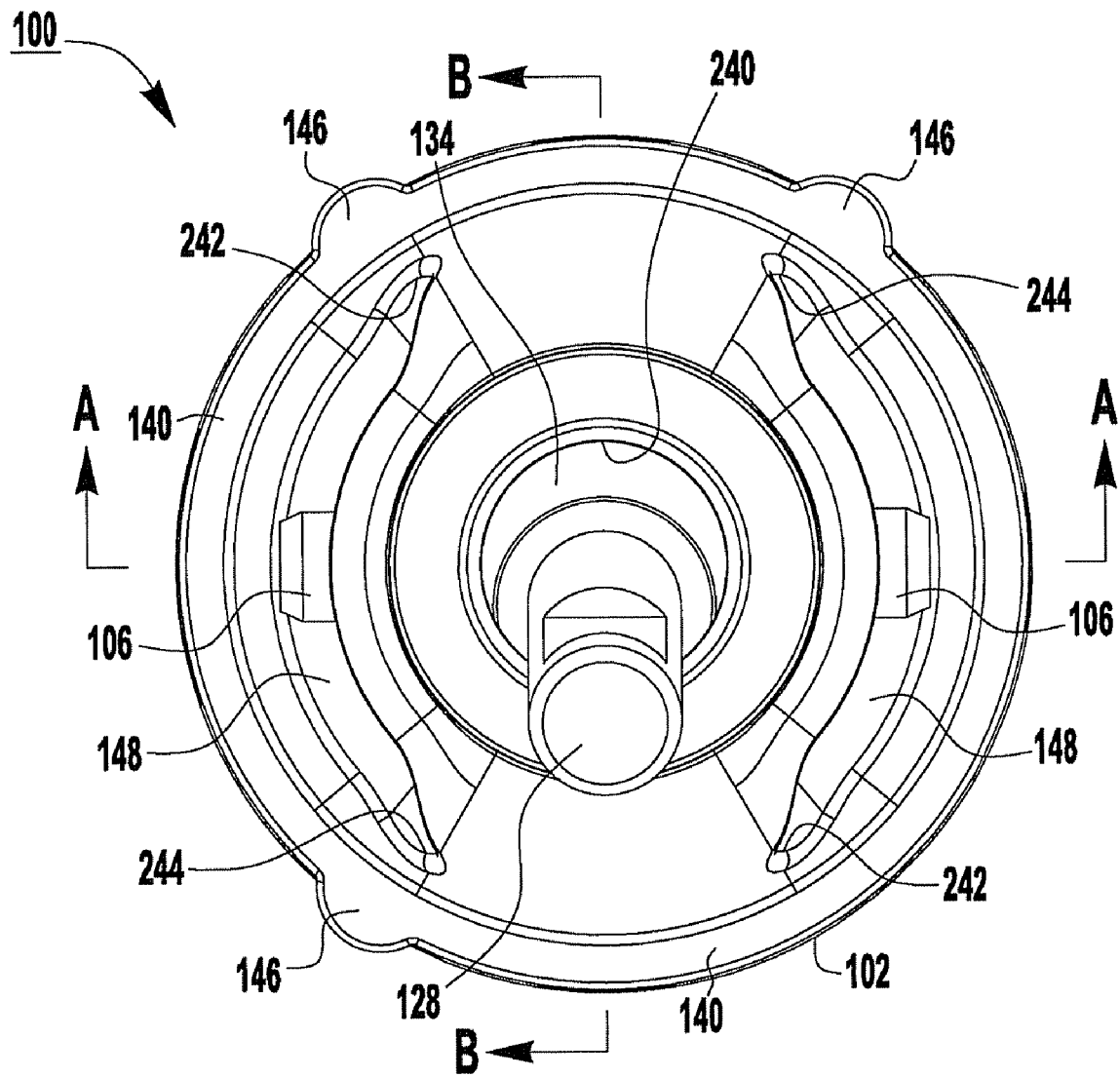
FIGS. 9A-9C show the exemplary valve cartridge of FIG. 1 in assembled form.
Figure 9B:
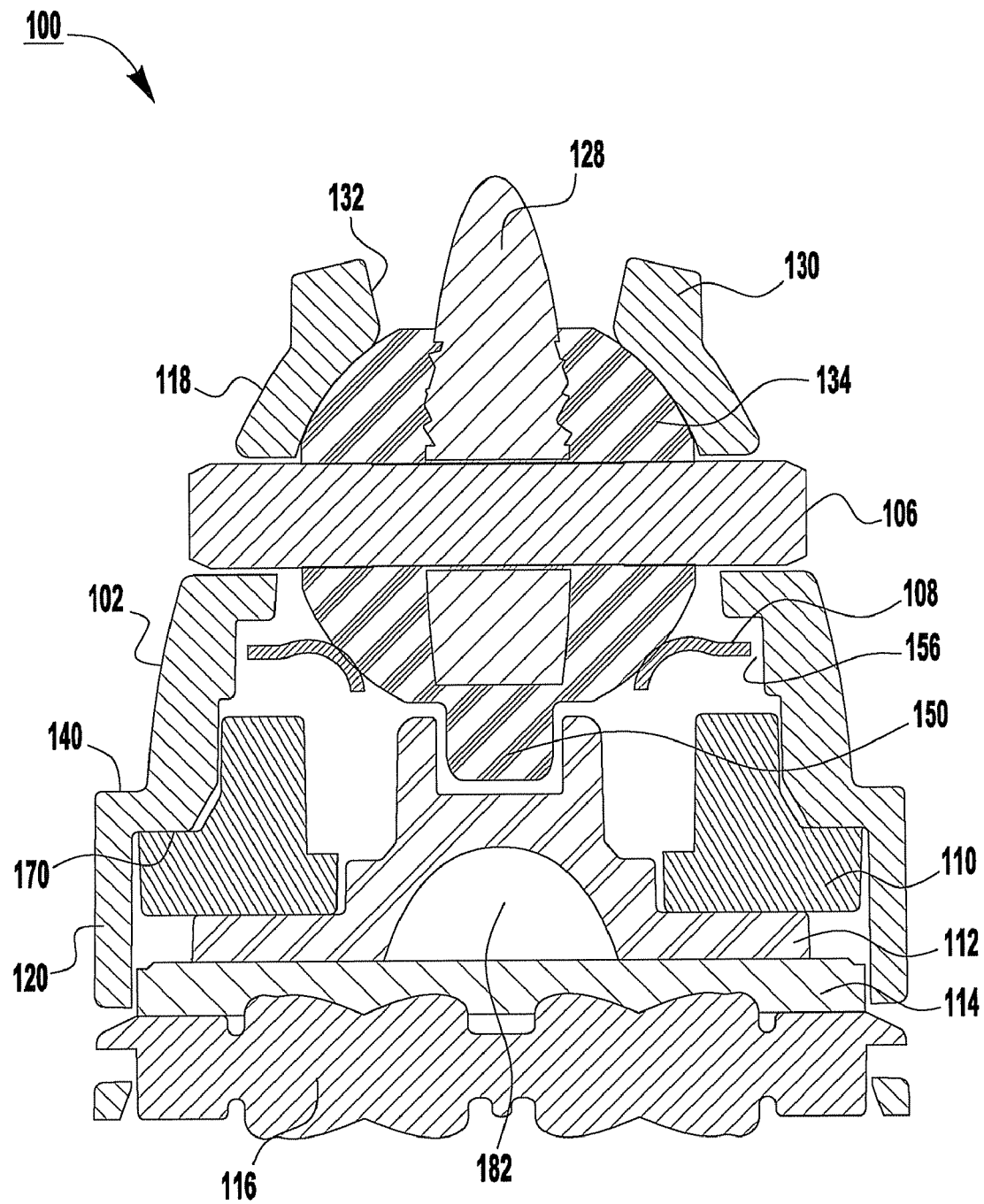
Figure 9C:
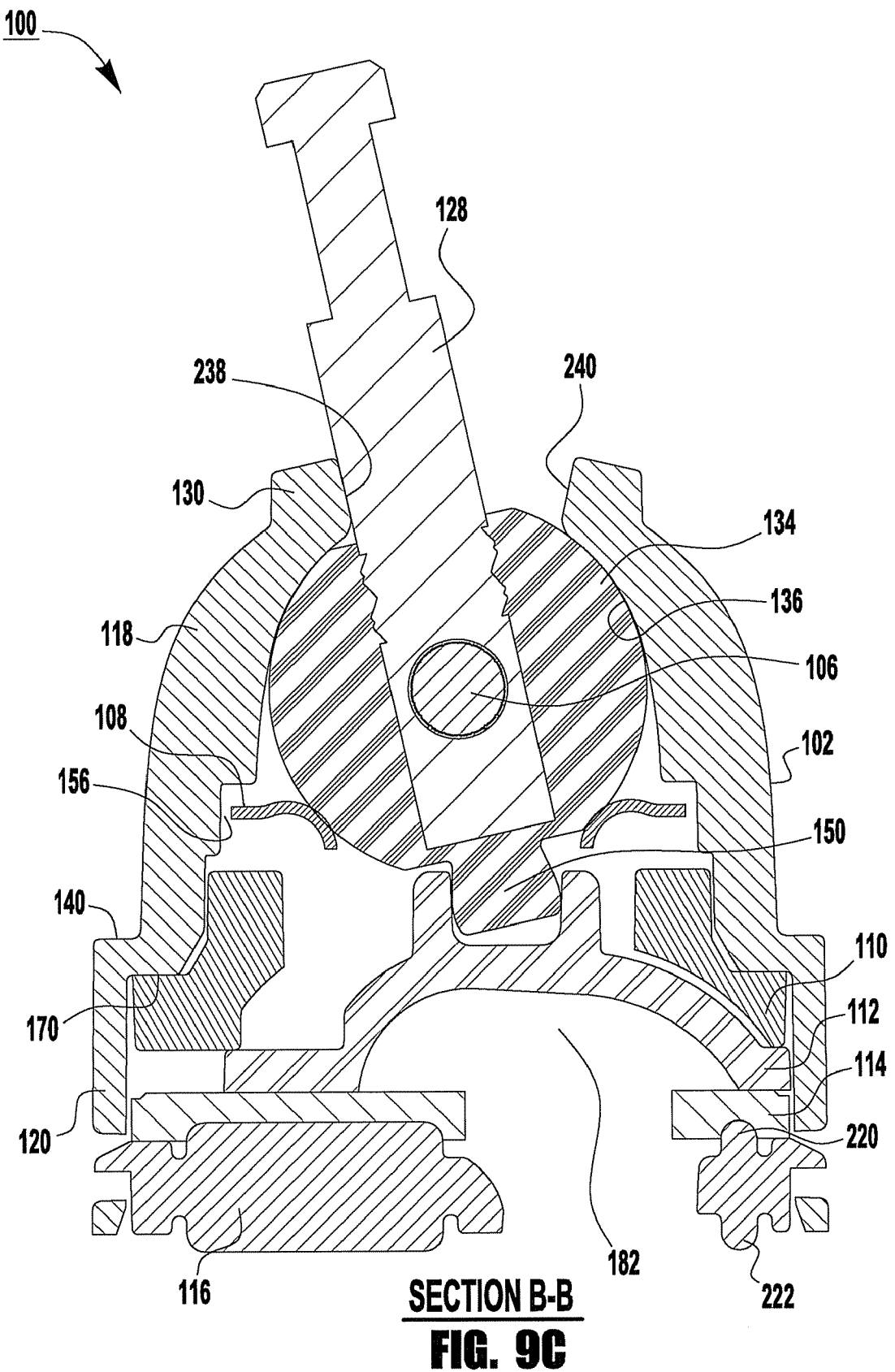

As shown in FIGS. 8A-8B, the base seal 116 is a sealing member formed of an elastic material (e.g., rubber). The base seal 116 includes one or more projections 198 formed on a periphery 200 of the base seal 116, wherein each of the projections 198 fits inside the internal cavity 196 of one of the keys 146 of the housing 102. The projections 198 fix the base seal 116 relative to the housing 102, thereby preventing rotation of the base seal 116 within the housing 102. The base seal 116 also includes one or more tabs 202 formed on the periphery 200 of the base seal 116, wherein the one or more tabs 202 are deformable to fit in and extend through a corresponding one or more openings 204 formed in the housing 102 to secure the base seal 116 in the housing 102. The one or more tabs 202 can have different sizes.

Like the manifold 114, the base seal 116 has a cold water inlet aperture 206, a hot water inlet aperture 208 and a water outlet aperture 210. The cold water inlet aperture 206 and the hot water inlet aperture 208 of the base seal 116 each have walls 212 that slope from near a lower surface 214 of the base seal 116 to near an upper surface 216 of the base seal 116 to improve the flow of water through the base seal 116 and into the valve cartridge 100. The water outlet aperture 210 of the base seal 116 has walls 218 that slope from near the upper surface 216 of the base seal 116 to near the lower surface 214 of the base seal 116 to improve the flow of water through the base seal 116 and out of the valve cartridge 100. It is important that the apertures 186, 188 and 190 in the manifold 114 are aligned with the apertures 206, 208 and 210 in the base seal 116 when the valve cartridge 100 is assembled. Accordingly, the projections 192 on the manifold 114 and the projections 198 on the base seal 116 insure that the manifold 114 and the base seal 116 fit into the housing 102 in only one orientation, wherein the apertures 186, 188 and 190 in the manifold 114 are aligned with the apertures 206, 208 and 210 in the base seal 116 in this orientation.

A ridge 220 surrounds the apertures 206, 208 and 210 in the base seal 116 on the upper surface 216 of the base seal 116 (see FIG. 8A). Similarly, a ridge 222 surrounds the apertures 206, 208 and 210 in the base seal 116 on the lower surface 214 of the base seal 116 (see FIG. 8B). The ridges 220 and 222 of the base seal 116 are compressed when the valve cartridge 100 is installed in the valve body 144 (see FIGS. 9B-9C and 10 which show the ridges 220 and 222 overlapped with the compressing structure for purposes of illustration only). In particular, as the retention nut 142 is tightened down on the installation ledge 140 of the housing 102, the ridge 220 is compressed between the manifold 114 of the valve cartridge 100 and the base seal 116, while the ridge 222 is compressed between the base seal 116 and a seating surface 224 of the valve body 144 (see FIG. 10). It should be noted that although the projections 192 of the manifold 114 prevent the manifold 114 from rotating within the housing 102, the projections 192 nonetheless allow the manifold 114 to move axially within the housing 102. In this manner, the compression of the ridges 220 and 222 of the base seal 116 exerts a loading force on the flow plate 112 and the manifold 114. Accordingly, the flow plate 112 and the manifold 114 are kept in water-tight engagement with one another, after installation of the valve cartridge 100.

Figure 10:
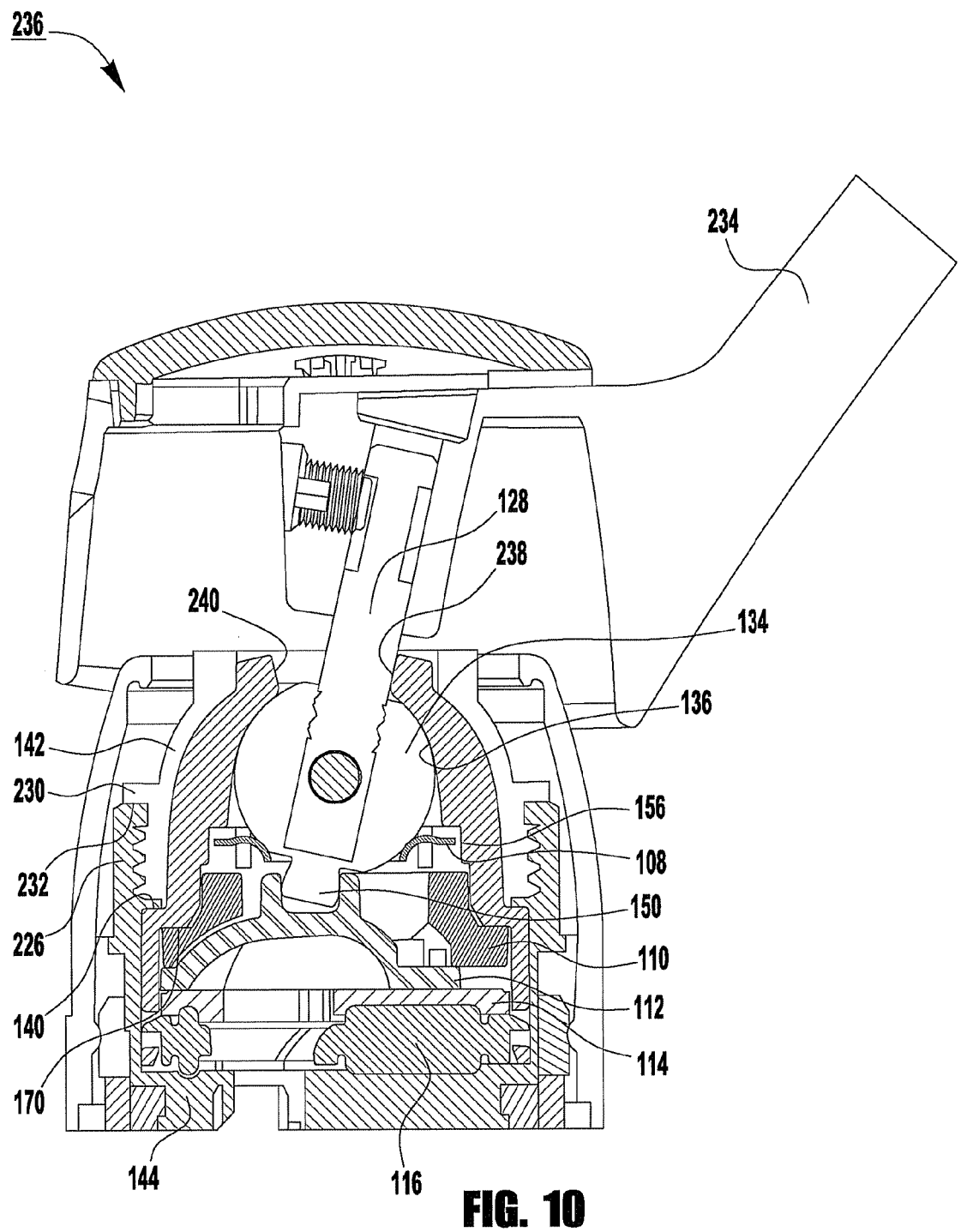
FIG. 10 is a mirror image of a cross-sectional view (along line B-B in FIG. 9A) of the exemplary valve cartridge of FIG. 1 after installation in a plumbing fixture.

The retention nut 142 is a hollow nut that engages sidewalls 226 of the valve body 144 to secure the valve cartridge 100 in the valve body 144 (see FIG. 10). For example, the retention nut 142 can have external threads for engaging complementary threads on the sidewalls 226. An inner surface of the retention nut 142 is shaped to conform substantially to a shape of the domed portion 118 of the housing 102. The installation ledge 140, however, is the only portion of the housing 102 that the retention nut 142 contacts during installation of the valve cartridge 100 in the valve body 144.

Additionally, the retention nut 142 and/or the valve body 144 can have structural features that prevent an excessive amount of torque from being transferred to the valve cartridge 100. For example, the retention nut 142 includes an annular flange 230 that bottoms out on a surface 232 of the valve body 144 to prevent excessive tightening of the retention nut 142 (see FIG. 10). Accordingly, the annular flange 230 functions to limit the maximum amount of torque that can be transferred from the retention nut 142 to the valve cartridge 100.

The position and the orientation of the flow plate 112 relative to the manifold 114 are controlled by the stem portion 128 of the ball-stem 104 projecting out of the housing 102 through the upper opening 126. For example, pivoting the stem portion 128 of the ball-stem 104 about the pin 106 changes the position of the flow plate 112 relative to the manifold 114, which changes the flow rate of the water. Rotating the stem portion 128 of the ball-stem 104 changes the orientation of the flow plate 112 relative to the manifold 114, which changes the temperature of the water.

An operating member 234 such as a handle, knob or the like (see FIG. 10) can be connected to the stem portion 124 of the ball-stem 104 to facilitate manipulation of the stem portion 128 by the user. Accordingly, after the valve cartridge 100 is installed in the valve body 144, the user can manipulate the operating member 234 which moves the stem portion 128 of the ball-stem 104 to change the position and/or orientation of the flow plate 112 relative to the manifold 114, thereby controlling the flow rate and temperature of the water flowing through the valve cartridge 100 and out a plumbing fixture 236, such as through a spout (not shown) of the plumbing fixture 236 (see FIG. 10).

A pivoting movement of the stem portion 128 of the ball-stem 104 about the pin 106 is limited by the stem portion 128 contacting opposing surfaces of the inner surface 132 of the raised collar 130 of the housing 102. Thus, the stem portion 124 of the ball-stem 104 contacts a first surface 238 of the raised collar 130 of the housing 102 when the valve cartridge 100 is in a fully closed state corresponding to a flow rate of zero (see FIG. 9C). The stem portion 128 of the ball-stem 104 contacts a second surface 240 of the raised collar 130 of the housing 102 when the valve cartridge 100 is in a fully open state corresponding to a maximum flow rate (see FIG. 9C). In this manner, the housing 102 (i.e., the raised collar 130) defines the range of flow rates for which the valve cartridge 100 can deliver the water.

A rotating movement of the stem portion 128 of the ball-stem 104 is limited by the distal ends of the pin 106 contacting a first pair of end portions 242 or a second pair of end portions 244 of the slots 148 (see FIGS. 1, 2A-2B and 9A). The end portions 242 and 244 of the slots 148 have a curved shape that corresponds to a curved shape of the pin 106, thereby maximizing the contact between the distal ends of the pin 106 and the end portions 242 and 244. Accordingly, the length of the slots 148, which function as temperature limit stops, define the range of rotation of the actuating mechanism (i.e., the ball stem 104 and the pin 106). Because the slots 148 are formed in the housing 102, the housing 102 functions as a stop for the actuating mechanism, thereby defining the range of temperatures for which the valve cartridge 100 can deliver the water.

The raised collar 130 and the slots 148 are formed integrally with the housing 102, such that no additional components (e.g., a bearing) need be introduced into the valve cartridge 100 to limit movement of the actuating mechanism to define the range of flow rates and/or temperatures of the water flowing through the valve cartridge 100. Furthermore, the raised collar 130 and the slots 148 are formed in a portion of the housing 102 (i.e., the domed portion 118) that is separate from a portion of the housing 102 (i.e., the cylindrical portion 120) that includes the sealing elements (e.g., the flow plate 112, the manifold 114 and the base seal 116). Accordingly, any deformation of the housing 102 at the raised collar 130 or the slots 148 is unlikely to affect the flow path of the water through the valve cartridge 100.

The above description of specific embodiments has been given by way of example. From the disclosure given, those skilled in the art will not only understand the general inventive concept and its attendant advantages, but will also find apparent various changes and modifications to the structures and methods disclosed. For example, although the exemplary embodiments herein describe a raised collar formed integrally with a housing to directly limit movement of an actuating mechanism, an upper opening in the housing can itself directly limit movement of the actuating mechanism. It is sought, therefore, to cover all such changes and modifications as fall within the spirit and scope of the general inventive concept, as defined herein, and equivalents thereof.

The invention claimed is:

1. A shell for housing dynamic sealing elements, the shell comprising:
   an upper opening through which an actuating mechanism can extend; and
   a pair of side openings, each side opening operable to receive an end of a pin extending through the actuating mechanism,
   wherein opposing surfaces surrounding the upper opening limit movement of the actuating mechanism about a first axis, and
   wherein opposing ends of each side opening limit movement of the actuating mechanism about a second axis.

2. The shell of claim 1, wherein a raised collar is formed integrally with the shell near the upper opening, and
   wherein the raised collar includes the opposing surfaces surrounding the upper opening.

3. The shell of claim 1, wherein a thickness of the shell near the upper opening is greater than a thickness of the shell near a lower opening of the shell.

4. The shell of claim 1, wherein at least one of the opposing surfaces slopes at a predetermined angle.

5. The shell of claim 4, wherein a first of the opposing surfaces slopes at a first predetermined angle, and
   wherein a second of the opposing surfaces slopes at a second predetermined angle.

6. The shell of claim 5, wherein the first predetermined angle and the second predetermined angle are the same.

7. The shell of claim 4, wherein the predetermined angle is selected so that the at least one of the opposing surfaces conforms to a side of the actuating mechanism when the side of the actuating mechanism contacts the at least one of the opposing surfaces.

8. The shell of claim 4, wherein the predetermined angle is between 0.5 degrees and 12.5 degrees relative to a longitudinal axis of the shell.

9. The shell of claim 1, wherein the opposing ends of each side opening have a curved shape that substantially conforms to a circumference of the pin.

10. The shell of claim 1, wherein the first axis is perpendicular to the second axis.

* * * * *